(12) United States Patent
Weyh et al.

(10) Patent No.: US 9,502,960 B2
(45) Date of Patent: Nov. 22, 2016

(54) MULTI-LEVEL CONVERTER TOPOLOGY WITH THE POSSIBILITY OF DYNAMICALLY CONNECTING INDIVIDUAL MODULES IN SERIES AND IN PARALLEL

(75) Inventors: Thomas Weyh, Munich (DE); Stefan Goetz, Forstern (DE)

(73) Assignee: Technische Universitaet Muenchen, Munich (DE)

( * ) Notice: Subject to any disclaimer, the term of this patent is extended or adjusted under 35 U.S.C. 154(b) by 352 days.

(21) Appl. No.: 13/990,463

(22) PCT Filed: Oct. 25, 2011

(86) PCT No.: PCT/EP2011/005385
§ 371 (c)(1),
(2), (4) Date: Oct. 10, 2013

(87) PCT Pub. No.: WO2012/072168
PCT Pub. Date: Jun. 7, 2012

(65) Prior Publication Data
US 2014/0049230 A1 Feb. 20, 2014
US 2015/0077069 A2 Mar. 19, 2015

(30) Foreign Application Priority Data

Nov. 30, 2010 (DE) ......................... 10 2010 052 934
Aug. 30, 2011 (EP) ..................................... 11179321

(51) Int. Cl.
*H02M 7/49* (2007.01)
*H02M 1/42* (2007.01)
*H02M 7/483* (2007.01)

(52) U.S. Cl.
CPC ............... *H02M 1/42* (2013.01); *H02M 7/483* (2013.01); *H02M 7/49* (2013.01); *H02M 2007/4835* (2013.01)

(58) Field of Classification Search
USPC .......................................... 363/34–37, 65–72
See application file for complete search history.

(56) References Cited

U.S. PATENT DOCUMENTS 5,483,433 A    1/1996  Yang
5,761,058 A *  6/1998  Kanda .................... H05B 41/16
                                                                    307/110

(Continued)

FOREIGN PATENT DOCUMENTS

CN    102130619 A    7/2011
DE    4203882 A1     9/1992

(Continued)

OTHER PUBLICATIONS

International Preliminary Report on Patentability dated Jul. 10, 2013 for International Application No. PCT/EP2011/005385. 14 Pages.

(Continued)

*Primary Examiner* — Jeffrey Gblende
(74) *Attorney, Agent, or Firm* — Eschweiler & Associates, LLC

(57) ABSTRACT

The present invention describes an electrical converter system for power supply systems, comprising at least two identical individual modules connected consecutively, characterized in that each individual module have at least four internal switching elements, at least one energy storage element and at least four connectors, wherein the connectors are paired and serve as a first and a second terminal pair; the internal switching elements of each individual module are designed in such manner that they are able to selectively connect one or both connectors of each terminal pair to the energy storage element; the cascaded connection of at least two individual modules is made in such manner that the connectors in the second terminal pair of a preceding individual module are each connected to the connectors of the first terminal pair in the respective following individual module, and at least one terminal of the first terminal pair of the first individual module of the cascaded connection and at least one terminal of the second terminal pair of the last individual module of the cascaded connection serve as terminals for the cascaded connection; and wherein the switching elements of the respective individual modules in the cascaded connection of at least two individual modules connect their respective energy storage element to the terminals of the cascaded connection in such manner that a selective serial or parallel connection of the energy storage elements is made.

21 Claims, 35 Drawing Sheets

(56) References Cited

U.S. PATENT DOCUMENTS

| | | | |
|---|---|---|---|
| 6,954,366 B2* | 10/2005 | Lai et al. | 363/71 |
| 7,269,037 B2* | 9/2007 | Marquardt | 363/71 |
| 7,755,918 B2 | 7/2010 | Barbosa et al. | |
| 7,817,451 B2 | 10/2010 | Barbosa et al. | |
| 2011/0013441 A1 | 1/2011 | Gruber et al. | |
| 2011/0019449 A1 | 1/2011 | Katoh et al. | |
| 2011/0032738 A1* | 2/2011 | Skinner et al. | 363/126 |
| 2011/0096580 A1 | 4/2011 | Asplund | |
| 2011/0291582 A1* | 12/2011 | Wei et al. | 315/254 |
| 2013/0200860 A1 | 8/2013 | Takeda et al. | |
| 2014/0226377 A1 | 8/2014 | Goetz et al. | |

FOREIGN PATENT DOCUMENTS

| | | |
|---|---|---|
| DE | 10217889 A1 | 11/2003 |
| DE | 102010052934 A1 | 5/2012 |
| EP | 1976107 A1 | 10/2008 |
| WO | 0105022 A1 | 1/2001 |
| WO | 03090331 A2 | 10/2003 |
| WO | 2006053448 A1 | 5/2006 |
| WO | 2008046772 A1 | 4/2008 |
| WO | 2012072168 A1 | 6/2012 |

OTHER PUBLICATIONS

International Search Report dated May 3, 2013 to Patent Application PCT/EP2011/005385.

G. Gateau, et al.; "Stacked Multicell Converter (SMC): Topology and Control"; EPE 2001-Graz; 2001; p. 1-10.

Barnes, et al. "Implementation of a Three-Phase Multilevel Boosting Inverter Using Switched-Capacitor Converter Cells." IEEE, Energy Conversion Congress and Exposition (ECCE), Sep. 12-16, 2010, S. 2141-2147.

Grandi, et al. "Dual Inverter Space Vector Modulation with Power Balancing Capability.", IEEE, 2009, pp. 721-728.

International Search Report and Written Opinion of the International Searching Authority dated Mar. 12, 2014 for International Application No. PCT/EP2012/002727.

Non-Final Office Action dated Oct. 7, 2015 for U.S. Appl. No. 14/235,812.

Notice of Allowance dated Apr. 25, 2016 for U.S. Appl. No. 14/235,812.

Notice of Allowance Dated Jul. 15, 2016 U.S. Appl. No. 14/235,812.

* cited by examiner

| Mode | Transistors |
|---|---|
| Parallel | α, δ |
| Serial | β and/or γ |
| Passive | — |
| 0 | α oder δ |

Right-side terminating  Left-side terminating

MULTI-LEVEL CONVERTER TOPOLOGY WITH THE POSSIBILITY OF DYNAMICALLY CONNECTING INDIVIDUAL MODULES IN SERIES AND IN PARALLEL

The invention relates to a special embodiment of a direct converter and the individual modular components thereof. The direct converter may be designed for single- or multiphase operation and on the input side may convert direct or alternating current to a direct or alternating current with any phasing or frequency. Converters of such kind have a wide variety of application possibilities; for example, they can be used to ensure controlled power supply to electric machines, and also for integrating direct current sources (battery accumulator units, solar systems) in an alternating current network.

BACKGROUND OF THE INVENTION

A large proportion of all energy consumed and generated is electrical energy. Electrical energy can be converted into a range of current-voltage combinations; on the other hand, in terms of chronological sequence, electrical energy can be converted from DC voltage to AC or three-phase voltage (with variable or fixed frequency) and vice versa. This conversion is now carried out mainly using power electronic systems, called converters.

The ongoing development of semiconductor technology, which was first introduced into power electronics about 30 years ago, enables and supports the production of such converters for ever expanding power and voltage ranges. Today, for example, switching of electrical currents and voltages in the medium voltage range is assured mainly with IGBTs and IGCTs. As semiconductors and the production means therefor undergo constant development, the reliability and power density of these components have also increased significantly.

Advances in the development of semiconductors also have beneficial effects for the development of novel converter topologies. Besides the high-voltage direct current (HVDC) transmission systems in the high-voltage range, which have until now incorporated thyristor circuits, attention has shifted to multilevel converters with significantly improved properties in terms of energy transmission, voltage or frequency conversion, and power factor correction.

Particularly in applications in the energy supply field, the switching voltages for converters are considerably higher than the inverse voltages of available power semiconductors. Consequently, application areas of this kind make use of circuit topologies that enable uniform distribution of the high voltage among multiple switching elements. One obvious method is direct switching in series of power semiconductors in converter branches. For this reason, each converter phase often consists of a series circuit of semiconductor switches, wherein the converter needs an intermediate circuit storage element in the form of a capacitor connected directly to the high voltage of the intermediate circuit.

However, these converter configurations become more and more complex as voltages increase, because the voltages must be distributed uniformly to the series-connected semiconductors and corresponding protection measures are needed to prevent overvoltages in the individual semiconductors.

In the event of a malfunction, extremely high discharge currents can flow through the capacitor in the intermediate circuit, and these in turn can lead to irreparable damage as a result of powerful mechanical forces and/or flashover damage.

A further disadvantage consists in that variable voltages can only be generated with drives of such kind with the aid of corresponding PWM conversion duty cycles, so that large voltage differences result in unfavourable duty cycles.

Many disadvantages of conventional converters can be solved by the modular multilevel converter such as is described in greater detail by R. Marquardt in DE 102 17 889. This system is capable of converting a practically limitless range of voltage characteristics from the terminal pairs on one side into a similarly wide range of voltage characteristics between the terminal pairs on the other side without having to differentiate between an input and an output according to the principle thereof. In the modular multilevel converter described by R. Marquardt, each phase of the converter is constructed from a large number of identical single modules connected in series. FIG. 1 shows a series circuit consisting of three identical modules 101, 102, 103 that make up a bridge branch 104 of a modular multilevel converter. Each single module functions as a two-terminal network and includes an energy storage element as well as a plurality of switching elements that can selectively hold or release current for both voltage directions, thereby achieving all four quadrants of the current voltage graph. FIG. 2 shows an embodiment of a single two-terminal network of a modular multilevel converter. A diode 205 to 208 is connected in parallel to each of transistors 201 to 204. The transistors can electrically connect output terminals 210 and 211 to capacitor 209. These single modules may particularly be switched to the following four states via their switches:

- setting a positive terminal voltage for any current direction;
- setting a negative terminal voltage with any current direction;
- bypass state (that is to say no energy is taken up or released by the individual module), free current flow in any direction;
- forced energy take-up by setting the voltage level.

Consequently, such an individual module is already capable—given appropriate control, for example with clocked switching of the active elements (possibly analogously with pulse width modulation)—to control its own energy uptake and release as required, and to approximately simulate a virtual load with certain properties to a source. These modules may now be connected together for full four quadrant operation for n sources (for example two incoming voltage systems) and m outputs (for example a three-phase low-voltage system) as desired for a given application.

A combination of two serial circuits, each consisting of z modules is referred to as a phase module, wherein each of the two serial circuits forms a "bridge branch". FIG. 3 shows a phase module 303 consisting of two bridge branches 301 and 302 in which the bridge branches are constructed from individual modules. The number z of modules in each bridge branch defines the voltage and harmonic properties of the converter. The phase modules in turn form the basic modules of a single- or multiphase power converter. Thus for example, as shown in FIG. 4, a system may be used to convert a single-phase AC or DC voltage to another single-phase AC or DC voltage via two connected phase modules 401 and 402. At the same time, the design of such a system is perfectly symmetrical in terms of inputs and outputs, thus enabling full four quadrant operation with respect to each connected pair. Moreover, the behaviour of the converter may be individually adapted with regard to inductive or capacitive behaviour at both the input and the output thereof. This means that energy can flow in both directions and can be altered dynamically.

Further, as shown in FIG. 5, a system for converting a three-phase AC voltage to a single-phase AC voltage or a DC voltage for example may be created with three connected phase modules 501, 502 and 503. The combined connections of the phase modules may also be thought of as a (DC voltage) busbar, so that n+m phase modules may be interconnected to create a network coupling for coupling an n-phase network with an m-phase network. FIG. 6 illustrates an exemplary interconnection of 5 phase modules 601 to 605 to form a coupling between a three-phase network and a two-phase network.

If certain areas of the current-voltage domain are sufficient, that is to say if full four quadrant operation is not required, connection arrangement may be simplified correspondingly.

Unlike a simple PWM conversion, which is only able to switch two voltage levels (0 and the full input voltage), from a source and accordingly can only process them in terms of timing and smoothing, the system of the modular multilevel converter is able to generate various stable voltage states as a function of the number z of modules, in the equivalent case 2z+1. Consequently, very fast voltage characteristics can be generated extremely precisely and with a very small harmonic component through corresponding high-frequency timing. Yet a pure step approximation at the same time is also possible.

A further advantage of the modular multilevel converter consists in that the energy storage units of the converter are located in the individual modules and no longer have to be designed as a single, large storage capacitor. This means that power converters with this converter topology can be constructed without a single large DC voltage intermediate circuit, through which extremely large short circuit currents may flow in the event of a fault. In conjunction with corresponding diodes over the switches, the storage capacitors of the individual modules also serve to damp possible voltage peaks extremely effectively, to protect the semiconductors for example. Consequently, unlike other converter topologies the inputs and outputs do not have be wired with additional capacitors, the insulating capabilities of which must be capable of sustaining the total maximum voltage.

Moreover, the four-quadrant operation of this converter type also enables applications such as power factor correction.

The construction of the converter from a plurality of identical individual modules also offers redundancy, so the functional capability of the converter can still be assured without additional switching devices if one or more of said two-terminal networks fails.

Compared with other converter topologies, the modular multilevel converter has the further advantage that the components of the respective modules do not have to be designed to sustain the full maximum voltage level of the input and output, they only have to isolate the module voltages. For many application fields of this converter type, this feature is financially very significant and it means that for the first time ever semiconductors can be used for these purposes.

In simple terms, the system relies on the controllable inclusion of modules in series. Modules that are not needed for generating a given voltage level are switched to the bypass state, so the energy storage unit keeps the charge it has at the time. But this represents a large unused potential. This occurs for example when the converter is only required to generate a relatively low voltage, so only certain of the modules are switched to the active state.

Particularly in application fields in which a relatively large voltage ratio is to be generated between the input and the output, or where low voltages occasionally have to be absorbed or released with high currents, this leads to unfavourable switching states and relatively high power losses in the components concerned.

Instead, the entire system must be designed to be able to sustain maximum voltages, which are seldom used; at the same time, the system must also be designed to handle the maximum current, although the current and voltage do not reach their respective maximum values at the same time in all application cases. The energy storage units used must also be designed for the maximum current demand, so they too must be overdimensioned.

In medical applications in which a converter serves as the source for a stimulation coil for inductive nerve stimulation, the stimulation coil also represents a highly inductive load. This means that the highest currents occur with very low voltages. Consequently, the individual modules and their energy stores are not used to the best effect in these applications either.

The matrix addressing approach for modules offers one possible way to mitigate these problems and to allow selective parallel connection of individual modules, while at the same time enabling the energy storage units of individual units to be switched between parallel and serial connection. However, this extremely desirable, maximum flexibility is bought at the price of a large number of required semiconductor switches, most of which must also be able to deal largely with the maximum total voltage level.

However, this high price does not appear to be practical except for research applications.

SUMMARY OF THE INVENTION

The problem to be addressed by the invention is to provide a method and a device for controlling and converting electrical current in the form of a converter that does not have the drawbacks described in the preceding.

This problem is solved with an electrical converter system having the features indicated in claim 1 and a method for controlling a plurality of correspondingly interconnected individual modules according to claim 19. Advantageous further developments of the invention constitute the subject matter of the respective dependent claims.

The electrical converter system of the invention comprises at least two individual modules of the same type connected one after the other. In this context, each individual module has at least three, preferably at least four internal switching elements, at least one energy storage element, and at least four connectors, wherein two each of the connectors serve as a first and a second terminal pair. The two individual modules are cascaded in such manner that the connectors of the second terminal pair from a preceding individual module in each case are connected to either the connectors of the first terminal pair of the of the respective following module, or the connectors of at least one intermediate module, which is arranged between the preceding individual module and the respective following individual module.

The switching elements of the respective individual modules in the cascade connection of the at least two individual modules thus connect their respective energy storage elements to the terminals of the cascade connection in such manner that a selectively serial or parallel connection exists between the energy storage elements.

In this context, a broad definition of the term "module" is understood. The "modules" or "individual modules" describe repeating component groups in a circuit topology, but they do not have to be constructively or structurally distinct from the other components of the overall circuit.

The term "terminal" is also not intended to imply any kind of structural limitation, but solely to indicate that this is a connection or input to a module. The term "serve as a terminal" is also to be understood in the same sense. In particular, the term "terminal" should not imply that the item thus designated is necessarily a detachable connection. The term "terminal" may rather be understood as a synonym for the terms "connection" or "input".

The invention is based on the recognition that a power converter that consists of a plurality of individual modules may also be designed in such manner that the energy storage elements may be selectively connected in parallel or in series. In such case, the individual modules must be configured in such manner that selective parallel or serial connection of the energy storage elements can be realised via the internal switching elements, so that no additional external switches are required as with matrix addressing. At the same time, the invention should ensure that the voltage loading of the internal switching elements is not substantially higher than the maximum voltage of the power storage elements.

Thus, a converter may consist of a cascade connection of individual modules with similar circuit topology to a multilevel converter. However, the energy storage elements of this novel power converter may be selectively switched in series or in parallel.

The fundamental advantage of such a selective interconnection consists in that a parallel connection of the energy storage elements of the individual modules reduces the overall internal resistance of the power converter (or of a branch of the power converter), so that in this switching state the converter is able to deliver multiple times more power than conventional converters. Furthermore, this means that the energy storage units in the individual modules can be made smaller depending on the application case.

Furthermore, a parallel connection enables simple charge balancing between the energy storage elements of the individual modules. In contrast, in previous systems charge balancing capability of the modules depends on whether they are able to transfer energy through the entire system or even through one of the terminal pairs without a current. In N. Flourentzou et al., 2009, the absence of such an option for voltage balancing of energy storage elements following uneven loading is described as a key problem in a number of previous multilevel approaches for converters (particularly for neutral-point clamped converters (NPC)). The article indeed calls for a solution to be found to this problem even with a larger number of additional power semiconductors.

A converter according to the invention may be constructed similarly to the multilevel converter described, using corresponding novel individual modules with the corresponding interconnecting terminals. This means that a plurality of individual modules of the same kind may be assembled to form a bridge branch for example, and two bridge branches may in turn create a phase module. The essential difference between the present invention and the previous multilevel converter, however, consists in that the individual modules of the novel converter are no longer connected directly in series as simple two-terminal networks, but instead the new individual modules are each connected to the respective next individual module via at least two connections in a kind of cascade connection. Thus it is not the cascade connection of the individual modules, but only the switching state of the internal circuit elements that determines whether an energy storage element of an individual module is to be connected to the following individual module in series or in parallel. Thus, a converter that is constructed from such individual modules may be controlled such that a connection in series exists for the energy storage elements at certain points in time and a connection in parallel at certain other points in time. In same way, the voltage generated by a cascade connection of individual modules may also be altered selectively.

Thus, the present invention enables the construction of special converter circuits that are able to convert temporal curves associated with practically any input voltage and current to equally almost limitless temporal curves for output voltage and current. The field of application thereof ranges from low voltage applications up to the maximum voltage level for energy transfer with up to a million volts. The invention described herein enables operation of the current-voltage graphs in all four quadrants depending on the exact construction thereof; that is to say the converter circuits may selectively absorb or discharge current for both voltage directions at both the input and the output.

As was stated in the introduction, the converter system may comprise a plurality of individual modules connected directly one after the other. In this case, the cascade connection is made in such manner that each of the connectors in the second terminal pair of a preceding individual module is connected to the connectors of the first terminal pair in the respective following individual module. However, the invention is not limited to such an embodiment. A further component or subassembly, which is referred to here simply as an "intermediate module", may also be provided between two adjacent individual modules in the cascade connection. Such an intermediate module may for example be formed by a balancing element for intermediate storage of energy from the energy storage elements, wherein this balancing element may have an inductance. The only essential feature is that the energy storage elements are able to be switched selectively in series or on parallel in—directly or indirectly—consecutive individual modules.

In the following description, a number of different exemplary individual modules that are suitable for the converter system according to the invention will be described. Despite the detailed nature of the descriptions, these individual modules are to be considered purely for exemplary purposes and no claim as to exhaustiveness is to be inferred therefrom.

Be that as it may, the invention identifies three module types that are to some degree generic, from which in turn various individual modules may be derived. In the terminology of the present invention, an individual module may be derived from a module type if it can be produced from that module type by removing individual switching elements from the module of the respective type or by replacing them with conductors in such manner that the other switching elements are still capable of enabling the energy storage element to be connected selectively in series or in parallel with the energy storage element of an adjacent module.

A first module type from which preferred individual modules may be "derived" comprises the following:
a first and a second conductor,
an energy storage element connected between the first and the second conductor, four bridge branches connected between the first and the second conductor,
  wherein each bridge branch comprises a pickup that may be connected to the first conductor via a first switching element and to the second conductor via a second switching element, and
  wherein each of the at least four connections of the individual module is connected to one of the pickups on the four bridge branches.

This first module type allows for connecting each terminal with each input of the energy storage element. However, this first module type is "overequipped" with switches since not all eight switching elements are needed for operation. Thus, some of these switching elements may be removed or short-circuited without losing the essential function thereof, that is to say the selective parallel and serial connection.

In fact, functioning individual modules with just four or even just three switching elements may be derived from this first module type. However, whereas the module of the first type can be operated in all four quadrants of the current-voltage domain, an individual module derived therefrom and having for example only three switching elements can only be operated in two quadrants of the current-voltage domain—such a module is referred to in the following as a "two-quadrant module".

Two-quadrant modules have the disadvantage of limited functionality, but they enable the use of fewer switching elements and may represent an advantageous choice according to the intended application.

The second generic module type comprises the following:
a first and a second conductor,
an energy storage element connected between the first and the second conductor,
two bridge branches connected between the first and the second conductor, wherein
  each bridge branch comprises a first pickup that that may be connected to the first conductor via a first switching element and to the second conductor via a second switching element, and the first and second pickups are connected to one another via a third switching element, and
  wherein one terminal of each first terminal pair is connected to the first or second pickup of one bridge branch, and one terminal of each second terminal pair is connected to the first or second pickup of the other bridge branch.

Suitable individual modules for the purposes of the invention may also be derived from this module type in the manner described in the preceding.

Finally, a third module type is suggested, comprising the following:
a first and a second conductor,
an energy storage element connected between the first and the second conductor,
a bridge branch connected between the first and the second conductor,
  wherein the bridge branch comprises a pickup that that may be connected to the first conductor via a first switching element and to the second conductor via a second switching element,
  wherein the one terminal of the first terminal pair is connected to the pickup and the other terminal of the first terminal pair may be connected to the first conductor via a third switching element,
  and one terminal of the second terminal pair may be connected to the first conductor via a fourth switching element, and
  wherein the other terminal of the second terminal pair is connected to the second conductor.

The third module type is only suitable for two-quadrant operation, but it is able to function with just four switching elements. As will be explained in greater detail subsequently with reference to an embodiment, it is even possible to derive a functioning individual module with just three switching elements from this third module type.

Of course it is also possible to use individual modules that are not derived from the given three module types for the converter system of the invention.

BRIEF DESCRIPTION OF THE DRAWINGS

The foregoing and other objects, features and advantages of the present invention will become apparent from the following detailed description taken in conjunction with the accompanying drawings, wherein.

In the drawings, identical parts, components and assemblies are identified with the same reference signs.

DETAILED DESCRIPTION OF PREFERRED EMBODIMENTS

The invention is based on the recognition that a power converter that is to consist of a cascade connection of a plurality of identical individual modules should be designed such that the energy storage elements of said individual modules may be selectively connected either in parallel or in series. The interconnection of the individual modules may be fixed beforehand, so that it is only possible to specify whether the energy storage elements of the individual modules are to be connected in parallel or in series via the internal switching elements. At the same time, the topology of the internal switching elements should ensure that the voltage load of said switching elements is not substantially greater than the maximum voltage of the energy storage elements.

Figure 1:
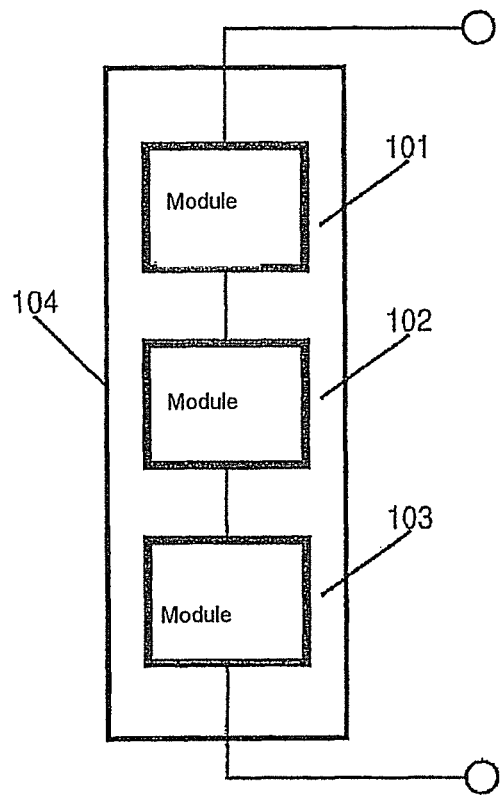
FIG. 1 describes a bridge branch of a modular multilevel converter, consisting of three identical two-terminal networks.
Figure 2:
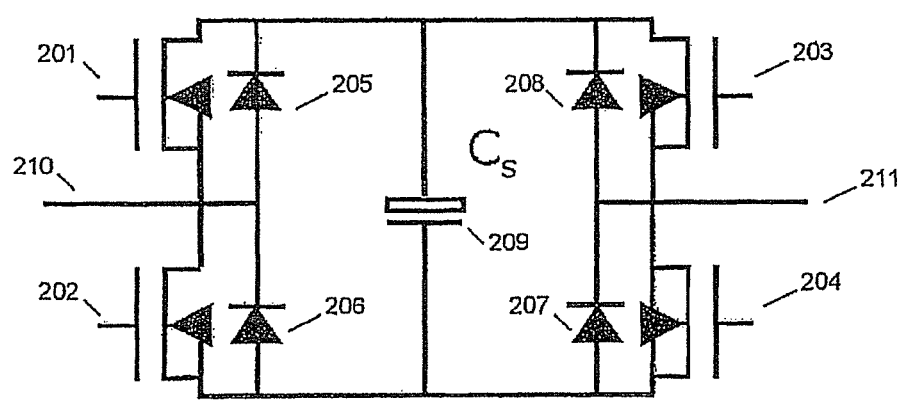
FIG. 2 shows the possible structure of an individual module of a modular multilevel converter.
Figure 3:
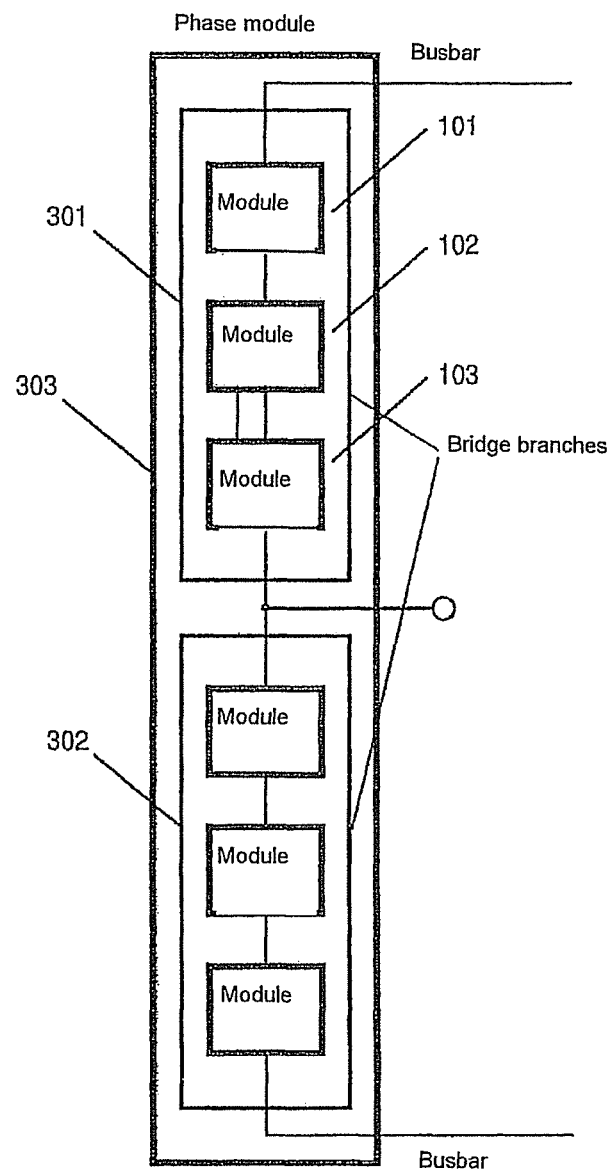
FIG. 3 shows a phase module of a modular multilevel converter consisting of two bridge branches, each with three identical two-terminal networks.
Figure 4:
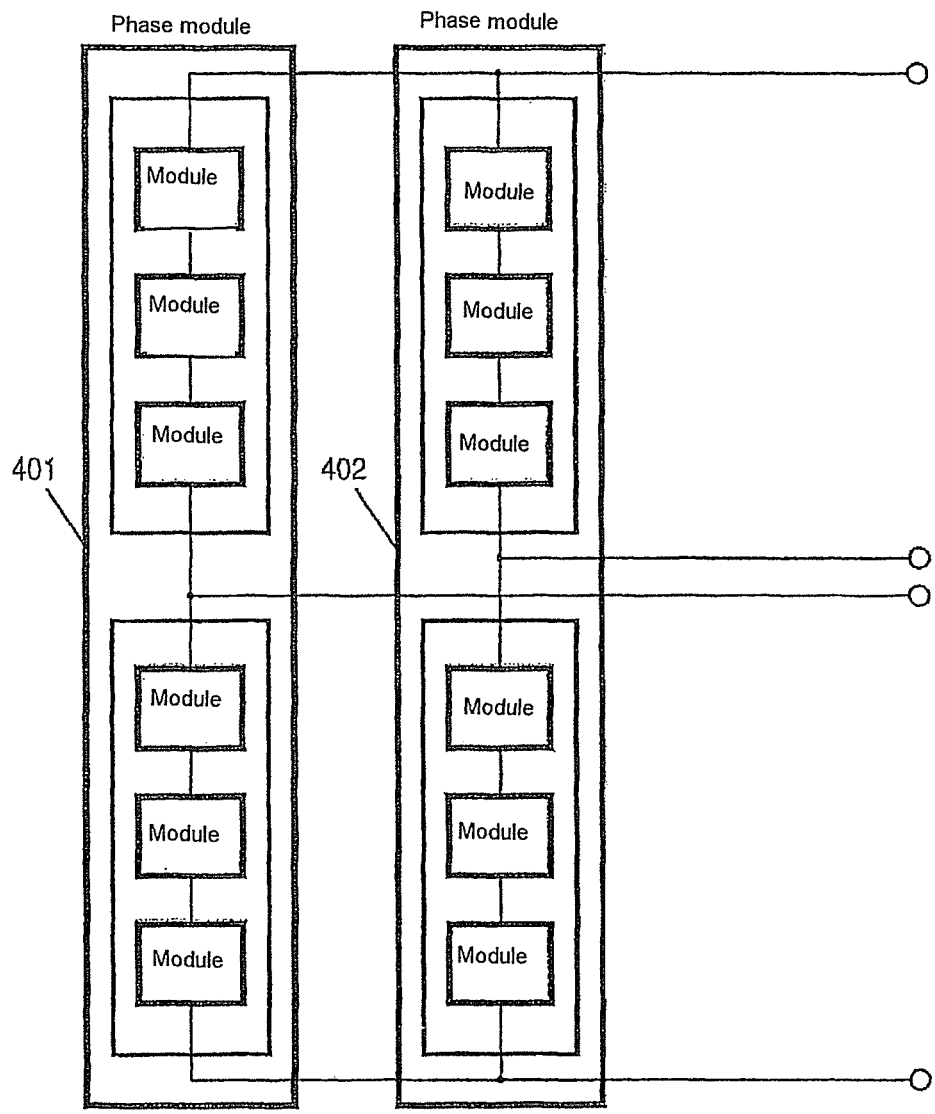
FIG. 4 shows a system for converting a single-phase AC (or DC) voltage to another single-phase AC (or DC) voltage, wherein the system consists of two phase modules of a modular multilevel converter connected together.
Figure 5:
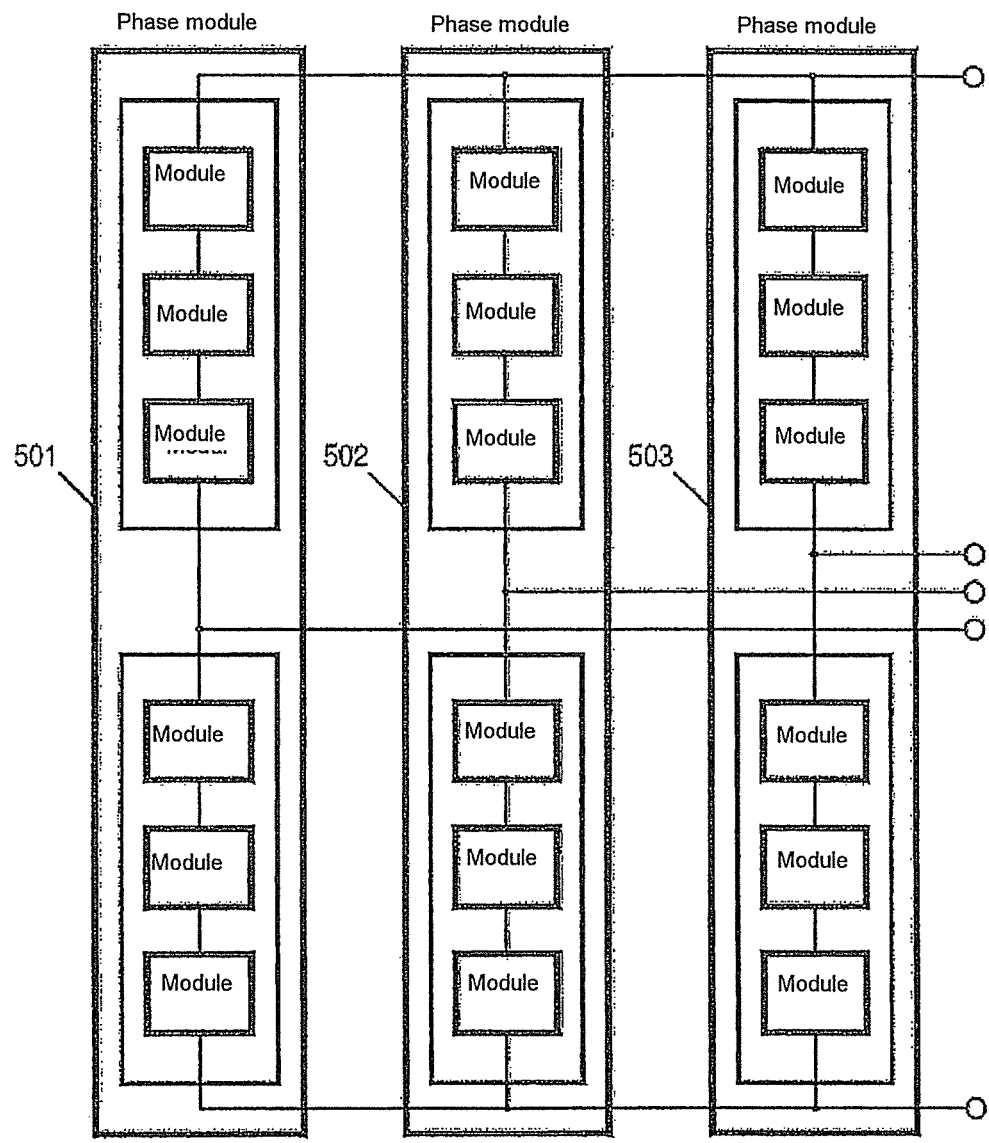
FIG. 5 shows a system for converting a three-phase AC voltage to a single-phase AC voltage or a DC voltage, wherein the system consists of three phase modules of a modular multilevel converter connected together.
Figure 6:
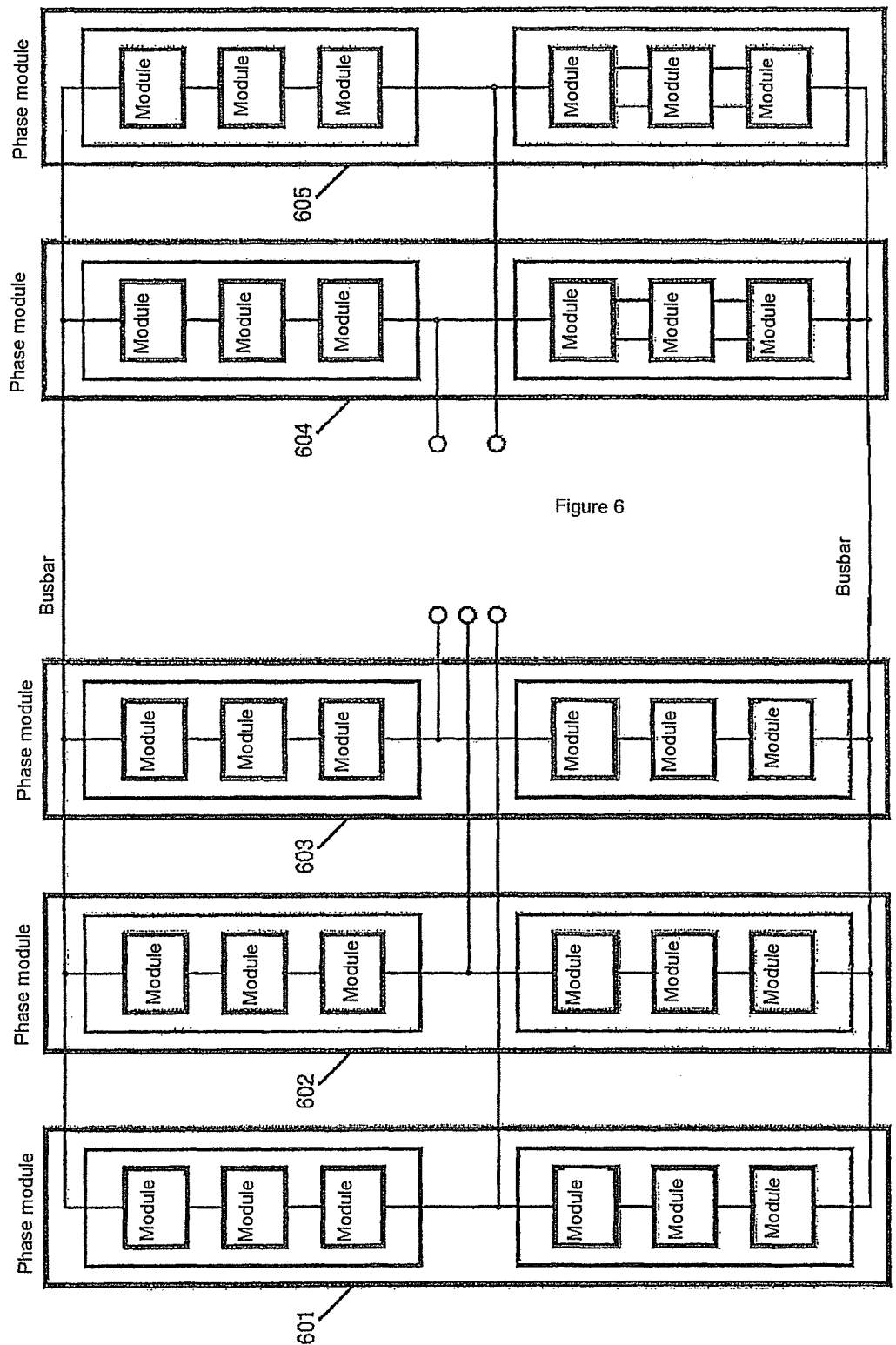
FIG. 6 shows a system for coupling a three-phase network with a two-phase network, wherein the system consists of three and two connected phase modules of a modular multilevel converter.
Figure 7:
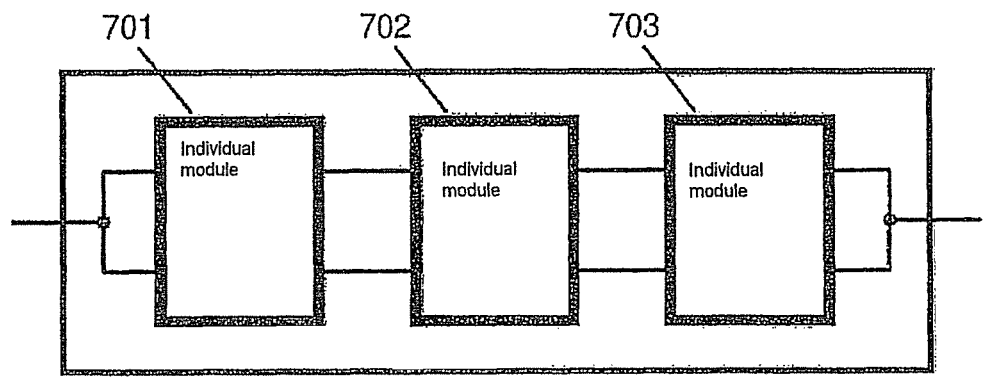
FIG. 7 shows a cascade connection of three individual modules according to the invention, so that for example a bridge branch of a power converter is formed.

FIG. 7 shows an example of a possible external wiring arrangement of three individual modules 701, 702 and 703 according to the invention to form a cascade connection, such that, for example, a bridge branch of a power converter is formed. An individual module is connected to the subsequent connection via at least two connections, so that the energy storage elements of an individual module may be connected to the energy storage element of the subsequent individual module either in parallel or in series.

Figure 8:
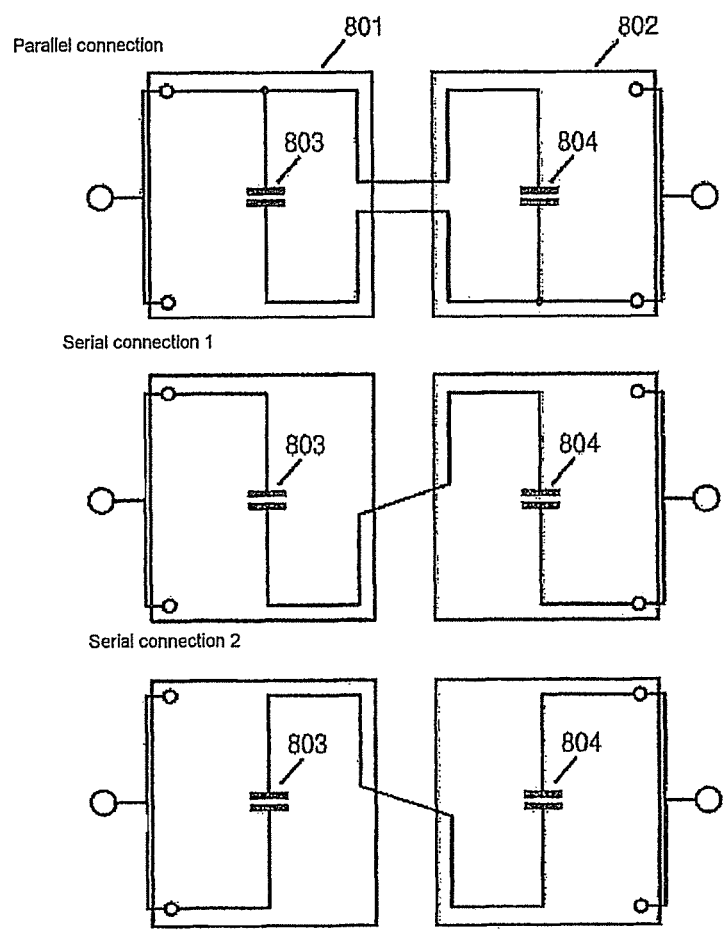
FIG. 8 shows the parallel and in-series switching states of two consecutively switched individual modules according to the invention.

FIG. 8 shows the switching states of two consecutively connected individual modules 801 and 802 required for this purpose: parallel connection of two energy storage elements 803, 804 and serial connection of energy storage elements 803, 804 in two possible polarities. Of course, these interconnections are also possible for a connection in parallel or in series of more than two modules. The separate modules should also be designed such that they are able to generate switching states comparable to those of the two-terminal networks of the described multilevel converter. In particular this means that individual modules can be connected so that they enable a current flow from a preceding individual module (or an external connection of a bridge branch) to a subsequent individual module (or another external terminal of a bridge branch) without integrating their own energy storage element in the process.

It is also advantageous if the individual modules are designed such that the connectors of the last terminal pair of an external individual module of a cascade connection can be hardwired to each other. This is shown for example in FIG. 7 for the first and last of the three individual modules. In this way it can be provided that a cascade connection of at least two of the novel individual modules form a bridge branch with two external connectors in a manner similar to the serial connection of two-terminal networks of the described multi-level converter.

Since the connection of each of two such individual modules can be selectively controlled via the respective switching elements, it is possible according to the present invention to control a consecutive connection of several individual modules in such manner that at least one series connection of energy storage elements and one parallel connection of energy storage elements is present simultaneously in such consecutive connection.

It is then very easy to switch the energy storage elements of individual modules to a parallel connection when the voltages of the energy storage elements in question are similar. On the other hand, it is also possible to ensure that switching to a corresponding parallel connection occurs relatively seldom compared with the total number of switching cycles via the control for the corresponding individual modules of the power converter. For example, a converter with a 100 kHz clock speed might only switch corresponding modules to parallel operation every 10 or 20 ms for generating an AC voltage of 50 Hz, whereas switching must take place every 10 microseconds for the 100 kHz connection cycles.

Alternatively, a parallel connection of the energy storage elements at different voltages may also be made so that charge and voltage balancing is carried out before the parallel switching. For this purpose, it is practical also to switch additional balancing elements between each two adjacent individual modules that allow intermediate storage of a part of the energy of the energy storage elements. In particular, such balancing elements may have inductances.

In order to obtain individual modules according to the present invention, a separate access to both connectors of the energy storage element must be created in the interior for each individual module on both sides. This can be done in such manner that multiple modules can be connected consecutively to two connectors each, so that the energy storage elements of the modules may be operated selectively in series or in parallel. In this way, a modified multilevel converter may be created in which the original two-terminal networks are replaced with individual modules according to the invention having at least four connectors. These connectors constitute for example a first and a second terminal pair.

Such an individual module having exactly four connectors may also be considered a two-port network. A two-port network is defined as a four-terminal module with two terminal pairs, A1, A2 and B1, B2, each of which form a port, and wherein the current through each terminal pair is mirror-inverted. In particular, the two-port network created in this way is active and non-linear.

Through the splitting of the original two-terminal module described above, the first connector becomes terminal pair A1, A2 and the second connector becomes terminal pair B1, B2.

Each module thus contains multiple switching elements, via which the internal energy storage element may be connected to connectors A1, A2, B1 and B2. In particular, the switches should be able to generate the following mutually independent switching states:

connection or non-connection of terminal A1 with the first connector of the energy storage element
connection or non-connection of terminal A2 with the second connector of the energy storage element
connection or non-connection of terminal B1 with the first connector of the energy storage element
connection or non-connection of terminal B2 with the second connector of the energy storage element.

Figure 9A:
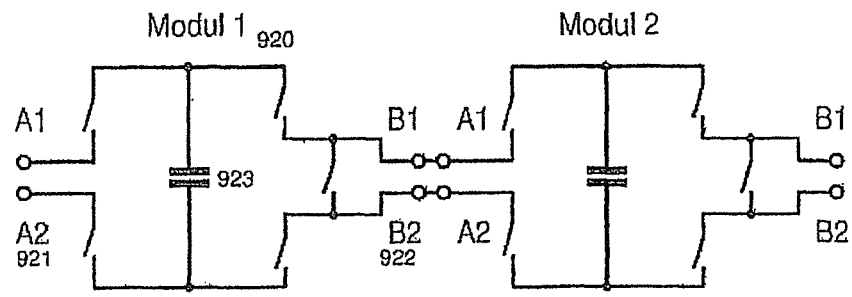
FIG. 9 shows four different possible embodiments of such individual modules according to the invention.
Figure 9B:
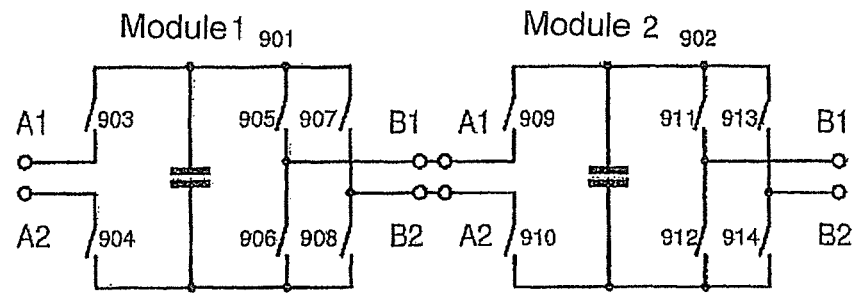
Figure 9C:
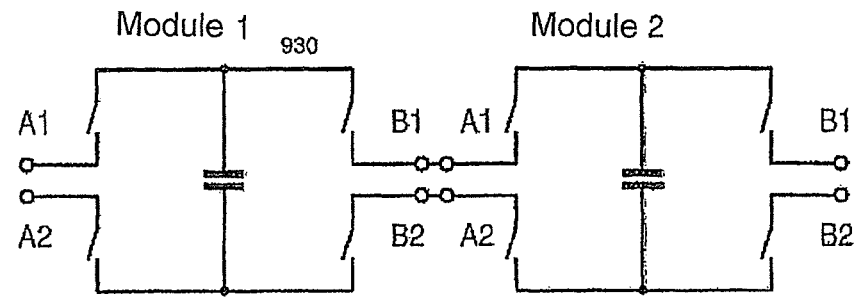

FIGS. 9a, 9b, 9c and 9d show four different possible embodiments of such individual modules that form a two-port network. Multiple identical individual modules are connected consecutively (in FIG. 9 two modules each are connected consecutively for exemplary purposes). In this context, they must be interconnected in such manner that the terminals of consecutive two-port networks must be connected to each other as follows:

Connection of terminal B1 of the first module to terminal A1 of the following module, and connection of terminal B2 of the first module to terminal A2 of the following module for the three embodiments according to FIGS. 9a, 9b and 9c.

Figure 9D:
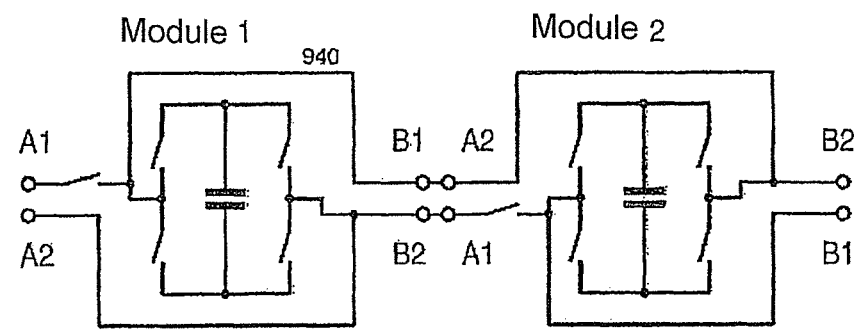

In contrast, for the embodiment of FIG. 9d the following applies:

Connection of terminal B1 of the first module to terminal A2 of the following module and connection of terminal B2 of the first module to terminal A1 of the following module.

Two or more consecutive two-port networks may then be switched in parallel or in series relative to their respective energy storage elements simply by actuating the switches thereof. This may be achieved via the following basic switching states:

The first connector of the energy storage element of the first two-port network is connected to the first connector of the energy storage element of the following two-port network, and the second connector of the energy storage element of the first two-port network is connected to the second connector of the energy storage element of the following two-port network (e.g., closing switches 905, 909, 908 and 910 in FIG. 9*b*). If at the same time terminal A1 of the first two-port is also connected to the first connector of the associated energy storage element (e.g., closing switch 903 in FIG. 9*b*) and terminal B2 of the last two-port network connected in this way is also connected to the second connector of the associated energy storage element (e.g., closing switch 914 in FIG. 9*b*), in a sense a parallel connection of two or more two-port networks is created. In this context, it is helpful to connect terminals A1 and A2 of the first two-port network together, as well as terminals B1 and B2 of the last two-port network connected in this way.

Or the consecutively connected two-port networks are connected such that:

The first connector of the energy storage element of the first two-port network is connected to the second connector of the energy storage element of the following two-port network (e.g., closing switches 907 and 910 in FIG. 9*b*). If at the same time terminal A2 of the first two-port is connected to the second connector of the associated energy storage element (e.g., closing switch 904 in FIG. 9*b*) and terminal B1 of the last two-port network connected in this way is also connected to the first connector of the associated energy storage element (e.g., closing switch 911 in FIG. 9*b*), a serial connection of energy storage elements of the two-port networks, as it were, is created, and any number of two-port networks may be connected in this way. In this context, alternatively, terminals A1 and A2 of the first two-port network may be connected to each other, and terminals B1 and B2 of the last two-port network wired in this way may also be connected to each other. The polarity of the serial connection may also be inverted, if the "first connector" and the "second connector" as well as "A1" and "A2", and "B1" and "B2" are each swapped correspondingly.

Additionally, both parallel connections and serial connections of energy storage elements of the individual modules may be made simultaneously when at least three two-port networks are used in a bridge branch.

The equivalent switching states of the energy storage elements according to the circuits of FIGS. 9*a*, 9*c*, and 9*d* may also be achieved by appropriate opening and closing the switches thereof correspondingly.

The embodiment of FIG. 9*c* requires only four switches per individual module, but it no longer allows the voltage direction to be selected freely in the series connection of energy storage elements. Consequently, the use of polarised energy storage elements, such as rechargeable batteries or electrolytic capacitors with this embodiment is more difficult. In the other embodiments shown, however, the polarity of the energy storage elements may be selected independently of the external module voltage. Further, in the embodiment of FIG. 9*c* it is advantageous for each bridge branch to use an odd number of individual modules, so that each of the two terminals of the marginal individual modules can be connected to one another again.

Figure 10:
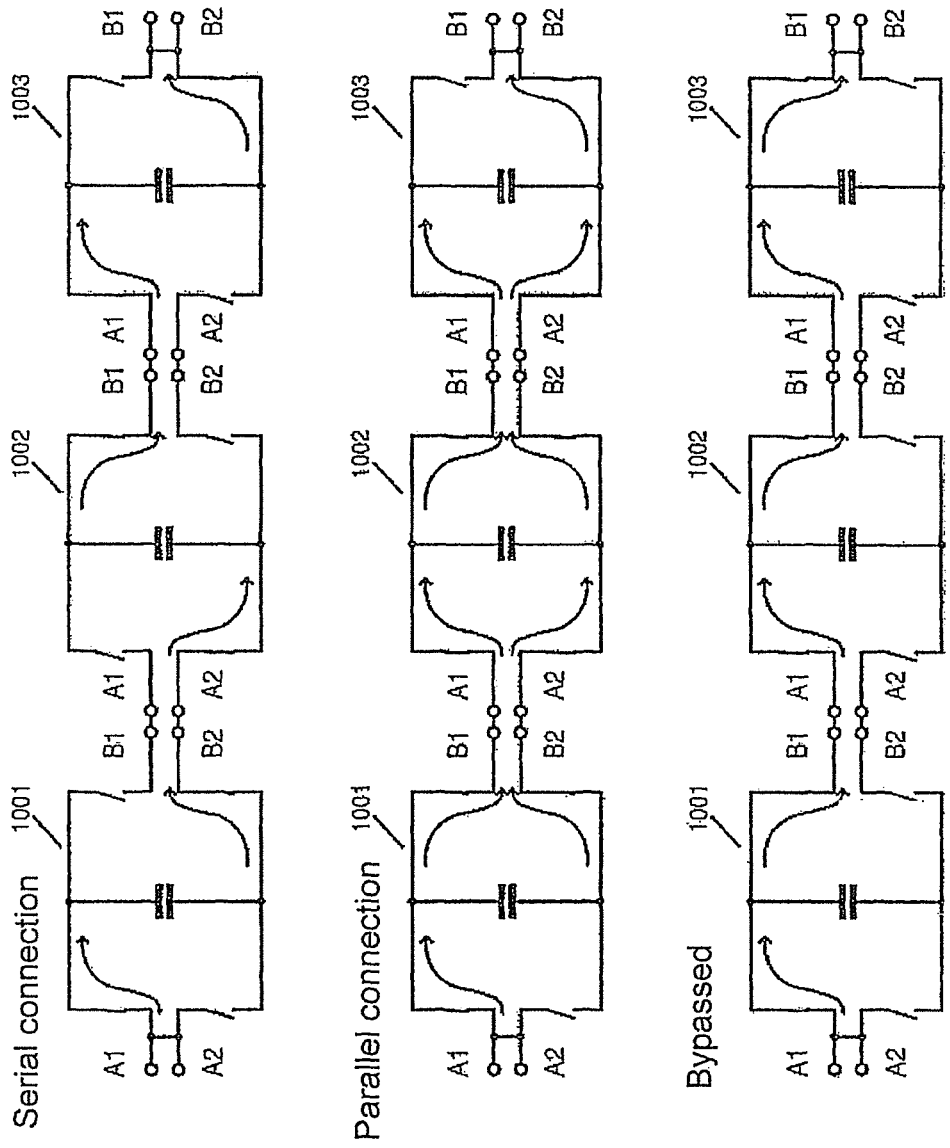
FIG. 10 shows possible switching states for the cascade connection of individual modules according to FIG. 9c.

FIG. 10 shows possible switching states for the Cascade connection of three individual modules 1001, 1002 and 1003 according to 9c.

Particularly in the case of the examples of FIG. 9d, the individual modules may be considered a combination of four-quadrant two-terminal networks with an energy storage element and an additional switching element at an input or output terminal. In this way, such an individual module in turn forms a two-port network, wherein one input terminal is connected permanently to one output terminal (for example, terminals A2 and B2 of each individual module in FIG. 9d). Regarding their external wiring, these individual modules differ from the alternatives shown in FIGS. 9a, 9b and 9c only in that the terminals of cascaded two-port networks must each be connected to each other with the connections transposed:

Connection of terminal B1 of the first module to terminal A2 of the following module and connection of terminal B2 of the first module to terminal A1 of the following module.

The embodiments presented are examples of possible interconnections of the energy storage elements and the associated switches, but no claim of exhaustiveness is to be inferred therefrom. In particular, the individual modules may also be equipped with additional switches to achieve the switching states described. Furthermore, individual modules having more than two electrical connections between said individual modules may also be used to carry out the present invention.

Interconnection of Multiple Modules to Create a Converter:

A single-phase or multi-phase converter may be created according to the invention, by assembling each bridge branch, such as are illustrated in exemplary manner with 3 individual modules in FIG. 7, from a plurality of said cascaded two-port networks. In this context, each of the output terminals B1 and B2 of a two-port network is connected to input terminals A1 and A2 (or A2 and A1 transposed). The respective connection terminals of a bridge branch are created either by an input side terminal A1 or A2 (wherein alternatively both terminals A1 and A2 may be connected) of the first module in the bridge branch and/or by an output-side terminal B1 or B2 (wherein alternatively both terminals B1 and B2 may be connected) of the last module is in the bridge branch.

Figure 11:
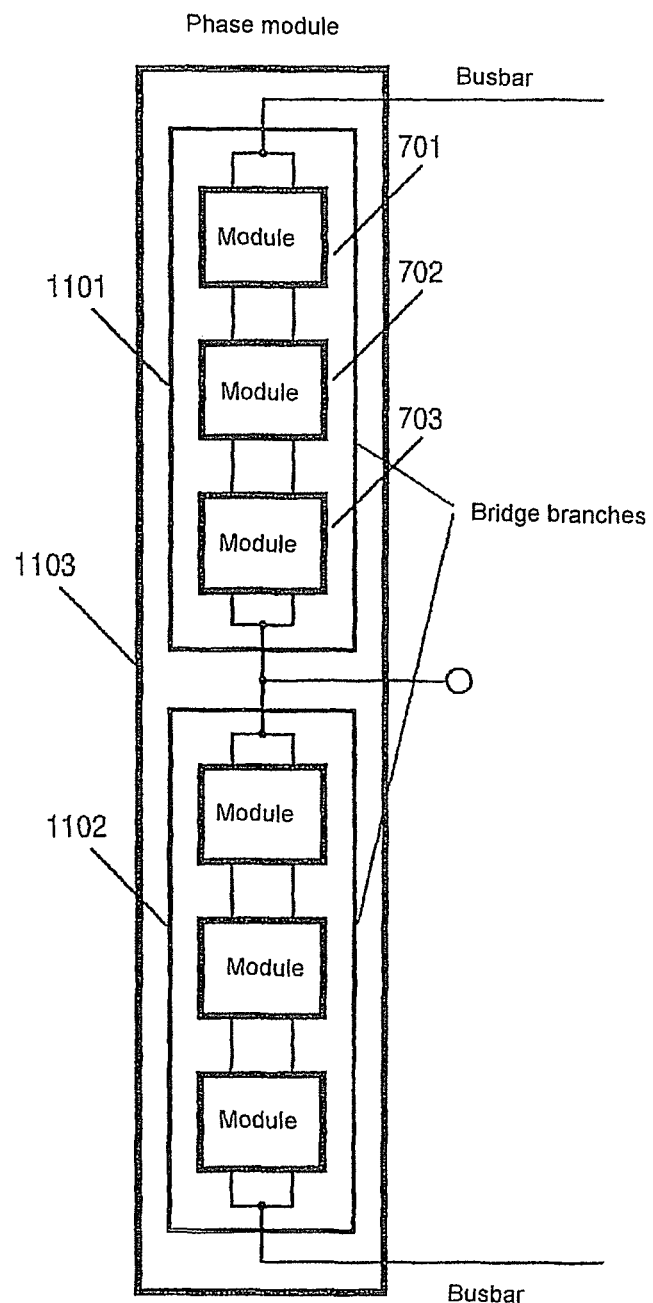
FIG. 11 shows a phase module consisting of two bridge branches, wherein each bridge branch is constructed from three identical individual modules according to the invention.

Correspondingly, according to FIG. 11 a phase module 1103 may be created from two bridge branches 1101 and 1102, wherein the bridge branches are constructed from individual modules 701, 702 and 703. In the same way as for the described multilevel converter, these phase modules, of which the upper and lower connectors are connected to a common busbar, form the basic modules of a single- or multiphase converter.

Figure 12:
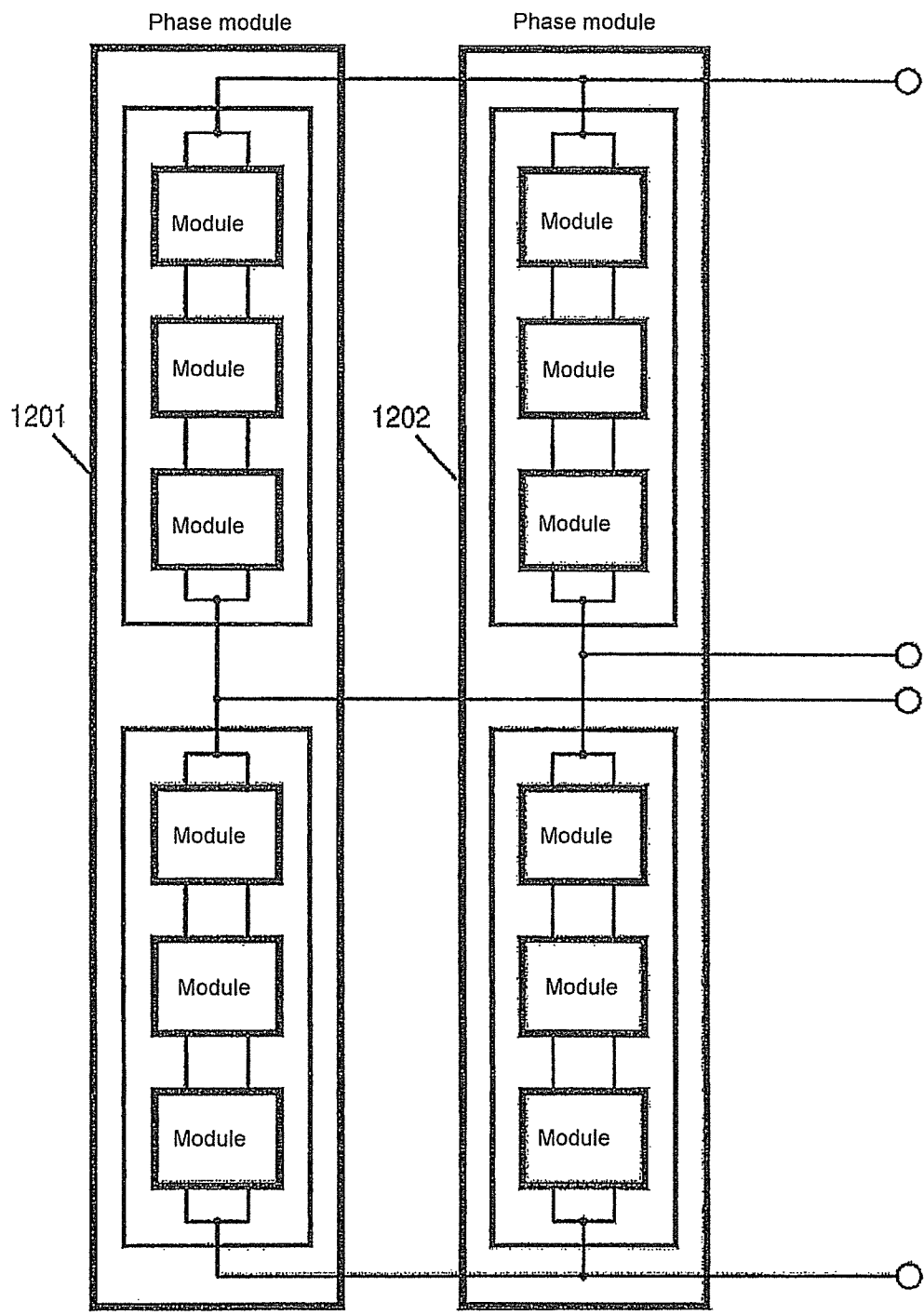
FIG. 12 shows a system for converting a single-phase AC voltage (or DC voltage) to another single-phase AC voltage (or DC voltage), which consists of two phase modules according to FIG. 11 connected together.

Two interconnected phase modules 1201, 1202 as shown in FIG. 12 in turn form a system for converting a single-phase AC or DC voltage to another single-phase AC or DC voltage. Once again, the configuration of such a system is completely symmetrical in terms of inputs and outputs, and thus enables full four-quadrant operation with regard to each connection pair. In addition, the behaviour of the converter, whether capacitive or inductive, may also be adapted individually at both the input and the output side. Consequently, the flow of energy is also possible in both directions and can be altered dynamically.

Figure 13:
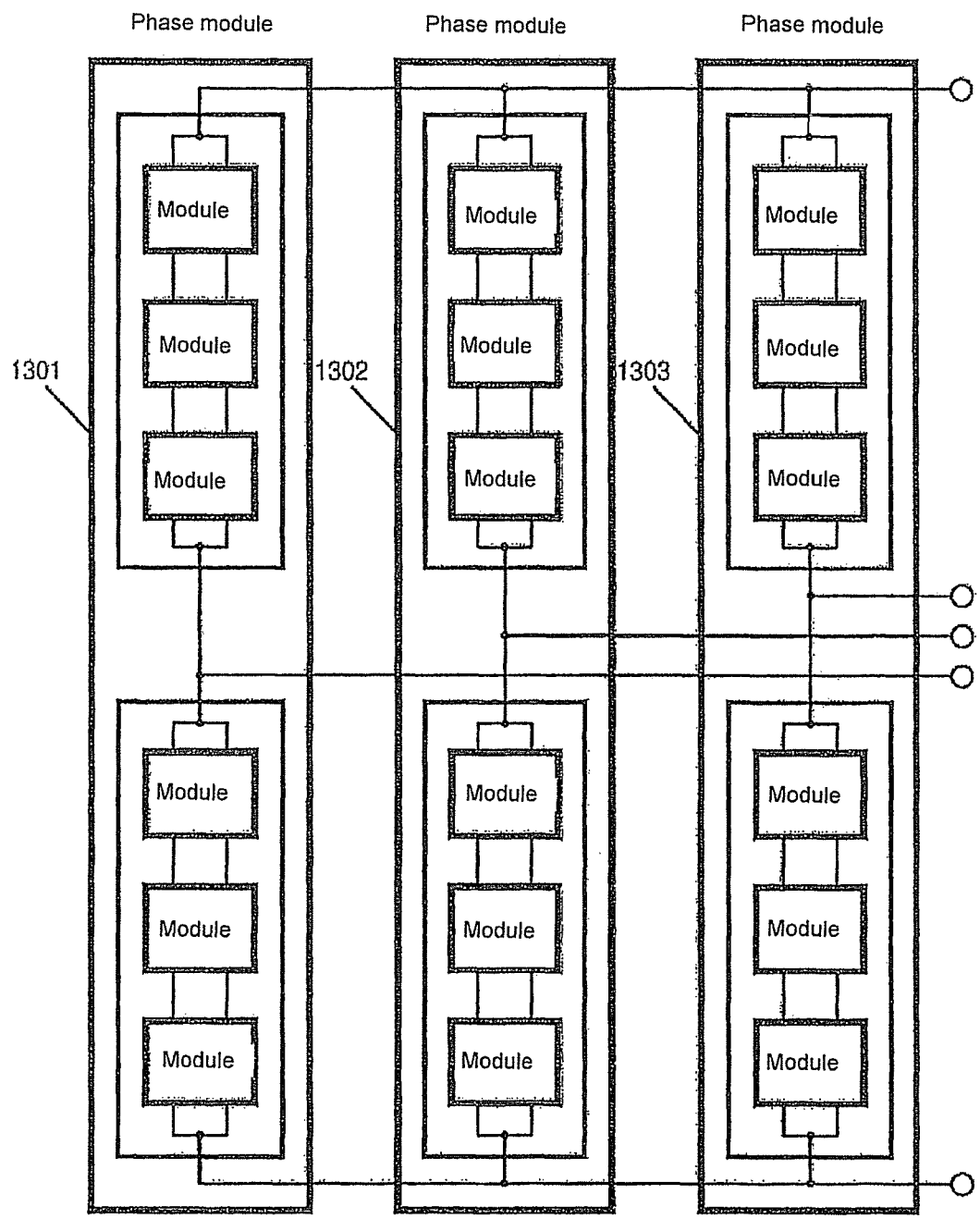
FIG. 13 shows a system for converting a three-phase AC voltage to a single-phase AC voltage or a DC voltage, which consists of three phase modules according to FIG. 11 connected together.
Figure 14:
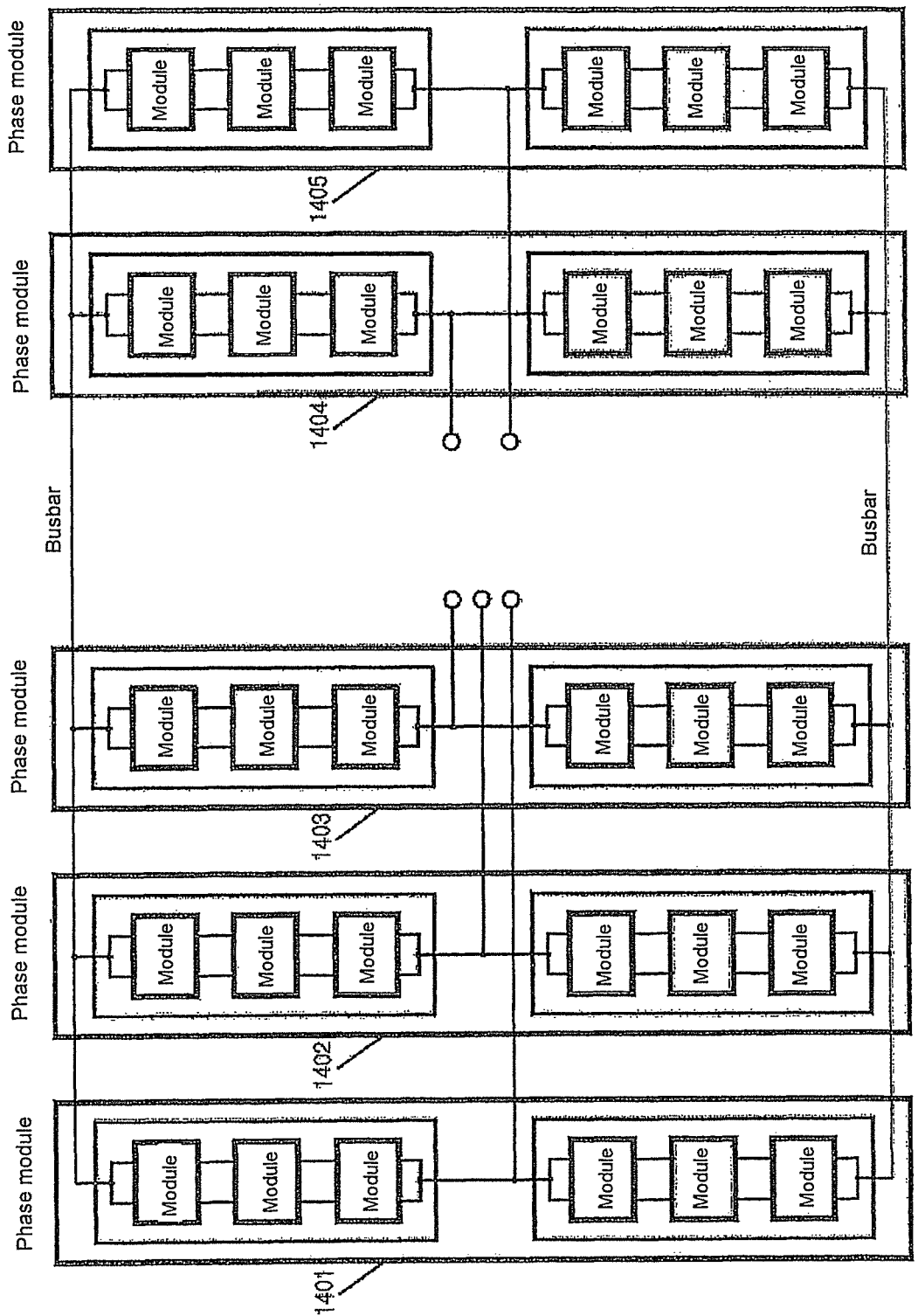
FIG. 14 shows a system for coupling a three-phase supply network with a two-phase network that consists of three and two phase modules according to FIG. 11 connected together.

A system for converting a 3-phase AC voltage to a 1-phase AC voltage or a DC voltage may also be formed for example by three interconnected phase modules 1301, 1302, 1303 as shown in FIG. 13. The combined connectors of the phase modules may also be considered as a (DC voltages) busbar, such that by connecting n+m phase modules a network coupling for coupling an n-phase network to an m-phase network is created. FIG. 14 represents an example of the interconnection of 5 Phase modules 1401 to 1405 to arrive at a coupling of a 3-phase network with a 2-phase network.

Moreover, the suggested design for combining a plurality of modules does not have to be based on identical modules. If the controller takes this into account, modules of this topology may also be combined with the suggestions contained in the original applications (DE10217889) (that is to say corresponding 2-terminal networks), to enable parallel connection for only a certain number of modules. In addition, the capacitors of the energy storage elements and the current-carrying capacities of the switches of the individual modules may be adapted individually to the prevailing circumstances depending on the requirements to which the converter is subject.

It may also be advantageous if one each of the bridge branches is replaced with a simple (preferably electronic) switch within a phase module.

Many alternatives regarding the exact configuration and method of application of the new modules are conceivable for development in the future.

Structure of Individual Modules with Electronic Switches

Figure 15:
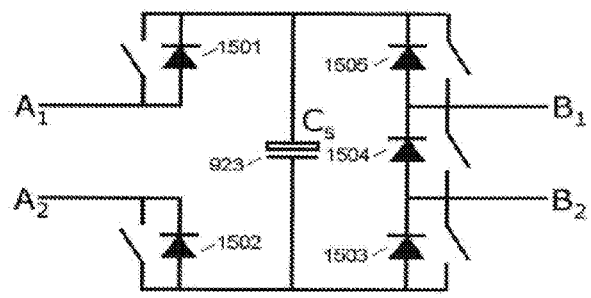
FIG. 15 shows an implementation of the required properties of an individual module of FIG. 9a according to the invention with additional use of diodes.
Figure 16:
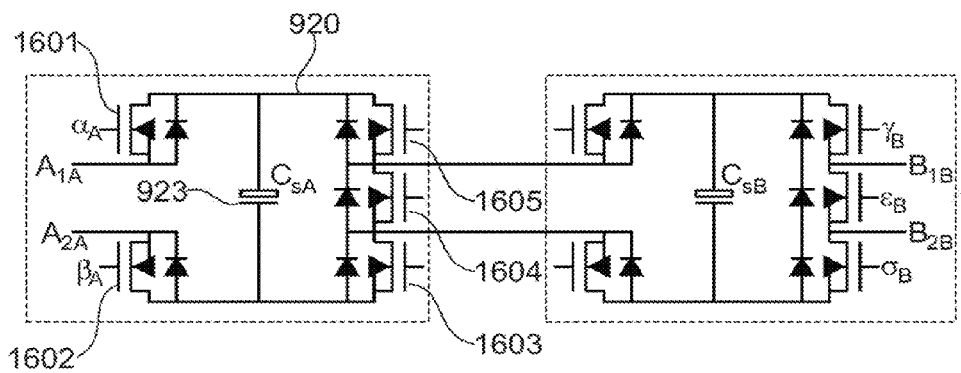
FIG. 16 shows a practical example of an individual module of FIG. 9a according to the invention with transistors.
Figure 17:
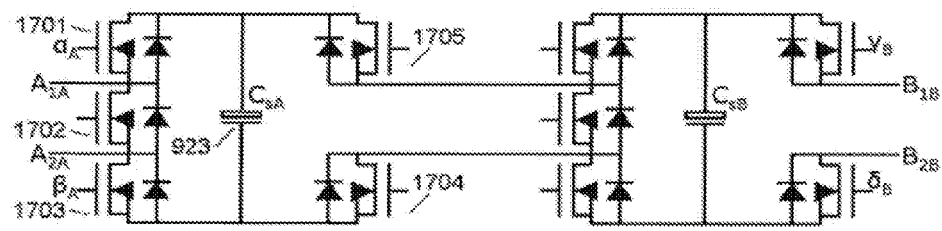
FIG. 17 shows a further practical example of an individual module of FIG. 9a according to the invention with transistors, wherein the additional switch in the individual modules instead of terminals B1 and B2 is able to connect terminals A1 with A2.

A simple implementation of the required properties for an individual module according to FIG. 9a may advantageously be achieved through the additional use of diodes 1501 to 1505, one possible embodiment of which is shown in FIG. 15. The voltage at the terminal pairs is limited to the capacitor voltage Vc even for open switches via the respective diodes. In the case of a semiconductor switch with freewheeling diode, the additional switch element, which may connect connectors B1 with B2, also inherently forces the requisite potential condition for this operating case. Thus, both the known serial connection and a parallel connection of adjacent individual modules are possible via the switching elements of the respective connection, in order to increase current carrying capacity for example. A practical configuration of two such individual modules, each with 5 transistors 1601 to 1605, is illustrated in FIG. 16. Alternatively, the additional switch in the individual modules may also connect terminals A1 with A2 instead of terminals B1 and B2. FIG. 17 shows such an individual module with 5 transistors 1701 to 1705, wherein transistor 1702 may connect the two terminals A1 and A2.

Figure 18:
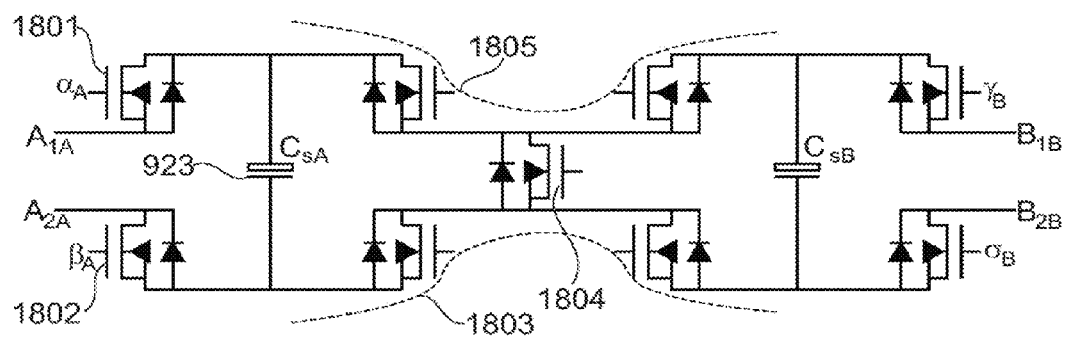
FIG. 18 shows the central additional current paths of an individual module of FIG. 15 according to the invention.

The central additional current paths are shown in FIG. 18. Compared with the described concept of the modular multilevel converter, one additional switching element is therefore needed for each individual module, and this only has to be adapted to the voltage level of the individual modules.

All switching elements may be in the form of transistors for example (for example MOSFET or also IGBT) or other semiconductor switches and the current carrying capacity thereof may be improved by parallelisation. For the additional power switch, which connects the two connector wires to the adjacent module, it is explicitly not necessary to use an element that is also capable of interrupting electric currents actively. Since the interruption may be effected by one of the other elements, simple self-extinguishing power semiconductors (such as thyristors and triacs), which are ultimately considerably less expensive than IGBTs for example in application areas where high currents and voltages prevail, may be used here too. In particular, this additional switching element also does not have to function in fast PWM mode, since it can only be used for the parallel or serial connection of individual modules.

To the extent that the input and output systems may not be improved by the separation of the two wires, the two connection pairs of the marginal individual modules may be simply combined. If necessary, however, sources and consumers may use this additional feature to good effect due to innovative diode or transistor wiring.

The marginal individual modules may also differ from the other individual modules in that they have only one connector on one side. In this way, the input marginal individual modules may already connect the two inputs A1 and A2. The output marginal individual modules may also only have one connector on the output side and require (compared with the embodiments of FIG. 16 only 2 switching elements on the output side (connection of both outputs B1 and B2).

It is true that this suggested circuit design would require only a minimal amount of additional material to create the individual modules of FIG. 9a and thus offer the described advantages thereof, but two properties—it would seem unfair to describe them as drawbacks—give cause to consider alternative approaches.

In the case of adjacent modules connected in series, the entire current flows through the switches that connect the two connecting wires, the full current passes continuously through all other semiconductors (except the readily discharging diodes) in all states. According to the circuit in FIG. 9a, it is not possible to dimension the switches for parallel and series applications separately (although the crossbar switch is exposed to lower thermal load).

Figure 19:
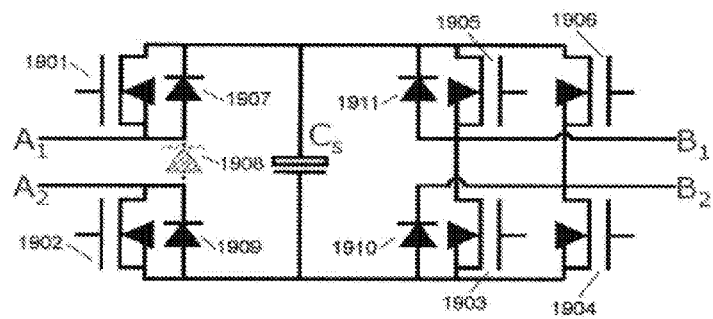
FIG. 19 shows a practical example of an individual module of FIG. 9b according to the invention.
Figure 20:
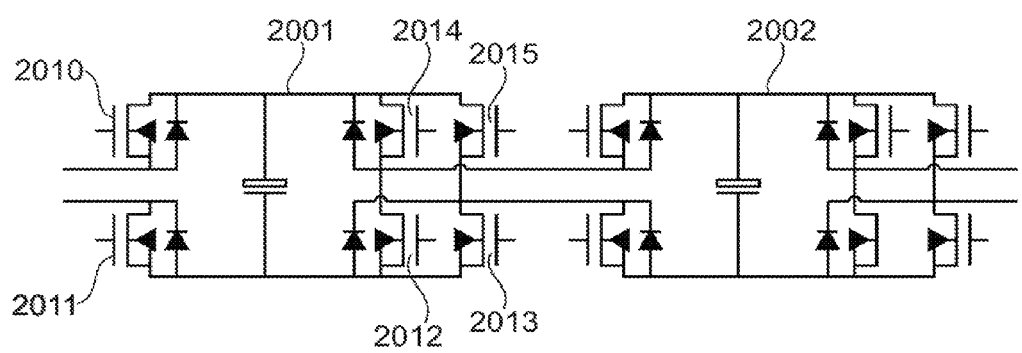
FIG. 20 shows a connection of adjacent individual modules of FIG. 19.

In the serial connection, the switch from the circuit according to FIG. 9a acts exclusively in conjunction with another transistor to join the two connection bars. However, if both connection paths to the connection bars for the energy storage element are in the form of semiconductor switches, the function and external connection structure remains present, but the transistors now have a dedicated function. This results in a structure of the individual modules shown in FIG. 9b. FIG. 19 shows a similar structure using 6 transistors 1901 to 1906 and additional diodes 1907 to 1911, FIG. 20 shows the merging of two adjacent individual modules 2001, 2002.

On the free side, this design as well as the alternative may be terminated with a diode in the module itself, in order to preserve the (scleronomous) potential constraint of the connection bars even in the event of a failure.

Figure 21:
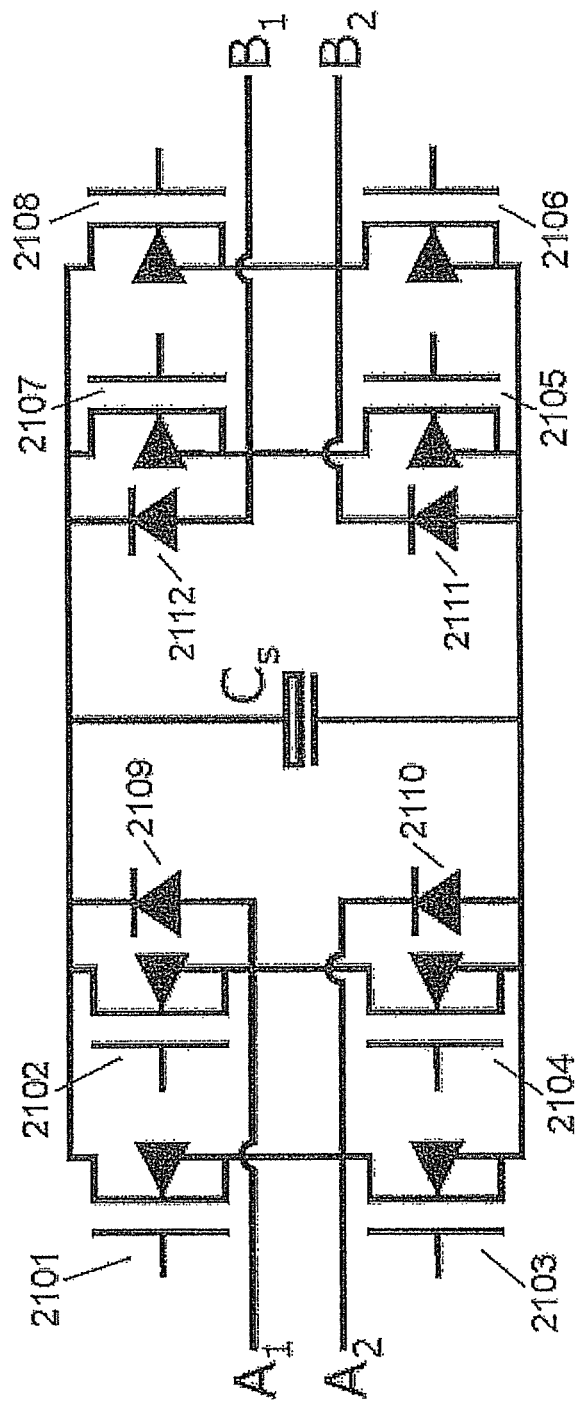
FIG. 21 shows an overequipped individual module of FIG. 9b, having more switching elements than is necessary for the simplest operation.

FIG. 21 shows an overequipped individual module having 8 transistors 2101 to 2108 and 4 diodes 2109 to 2112, which is provided with more switching elements than are necessary for the simplest operation.

Figure 21A:
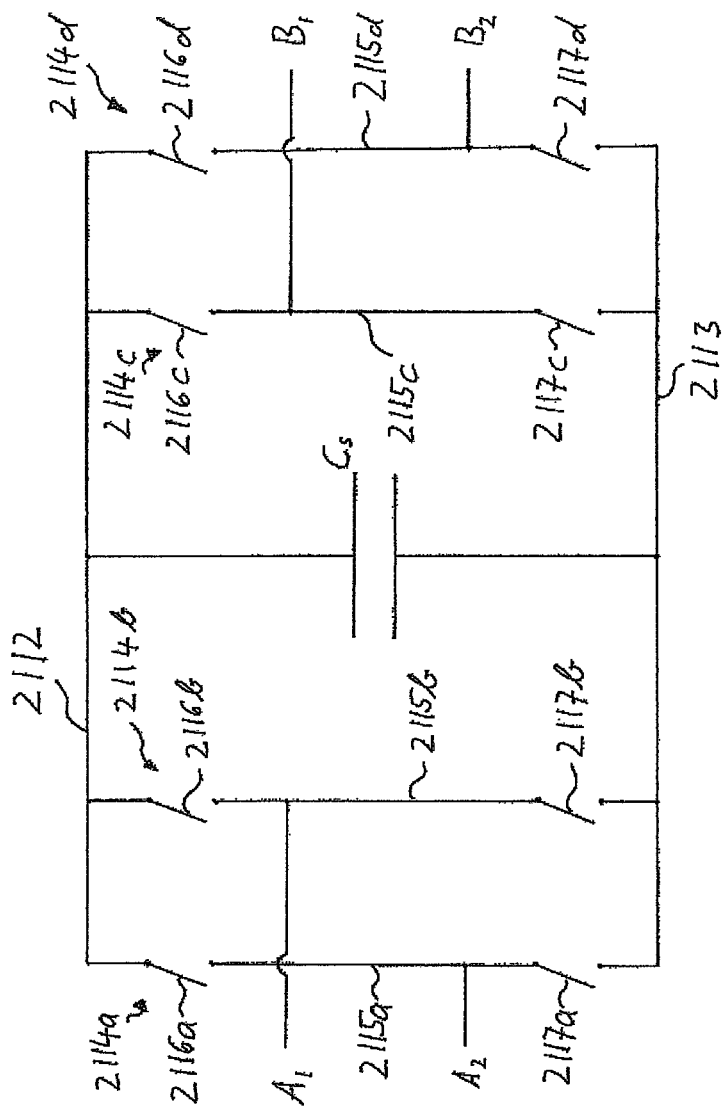
FIG. 21a is a schematic diagram of a first module type.

FIG. 21a is an alternative representation of the module of FIG. 21, in which the transistors are replaced with simple switch symbols and diodes 2109-2112 have been omitted. As may be seen from FIGS. 21 and 21a, with this configuration each terminal $A_1$, $A_2$, $B_1$ and $B_2$ is connectable to each input of the capacitor. However, the individual module is "overequipped" in the sense that not all transistors 2101-2108 or switches are needed in order to perform the desired function, particularly the selective switching of the capacitor in series or in parallel. However, the relatively large number of switching elements shown should not disguise the fact that in practice—at least in applications for higher current strengths—every transistor shown as a single item in the illustrated modules will be constituted in any case by a plurality of transistors connected in parallel, and switched synchronously in order to provide the necessary channel width for the current flow. Thus for example, if one of the two parallel connected switching elements shown in FIG. 21 or 21a can be dispensed with, this does not necessarily mean in practice that a saving of one transistor has truly been made, merely the individual control capability of a transistor (or group of transistors) has been saved.

First Module Type

The module type of FIG. 21a will be referred to in the following as the "first module type". It consists of a first conductor 2112 and a second conductor 2113, an energy storage element, in the present case capacitor $C_S$, which is connected between first and second conductors 2112, 2113, and four bridge branches 2114a-2114d, which are also connected between first and second conductors 2112, 2113. "Bridge branches" 2114a-2114d of the first module type should not be confused with the "bridge branches" of the converter circuit as a whole.

Each bridge branch 2114a-2114d comprises an associated pickup 2115a-2115d, which is connectable to first conductor 2112 via an associated first switching element 2116a-2116d, and to second conductor 2113 via an associated second switching element 2117a-2117d. Finally each of the at least four connectors $A_1$, $A_2$, $B_1$ and $B_2$ is connected to one of the pickups 2115a-2115d.

From this first module type, it is possible to derive a large number of individual modules suitable for the purposes of the invention. In this context, the word "derive" means that the specific individual module may be produced from the general first module type of FIG. 21a by short circuiting or removing individual switching elements of the module, and it would still be possible with the remaining switching elements to ensure that the energy storage element could be selectively connected in series or in parallel with an energy storage element of an adjacent module. This applies, for example, to the individual modules of FIG. 9b, FIG. 19 and FIG. 20.

Figure 22:
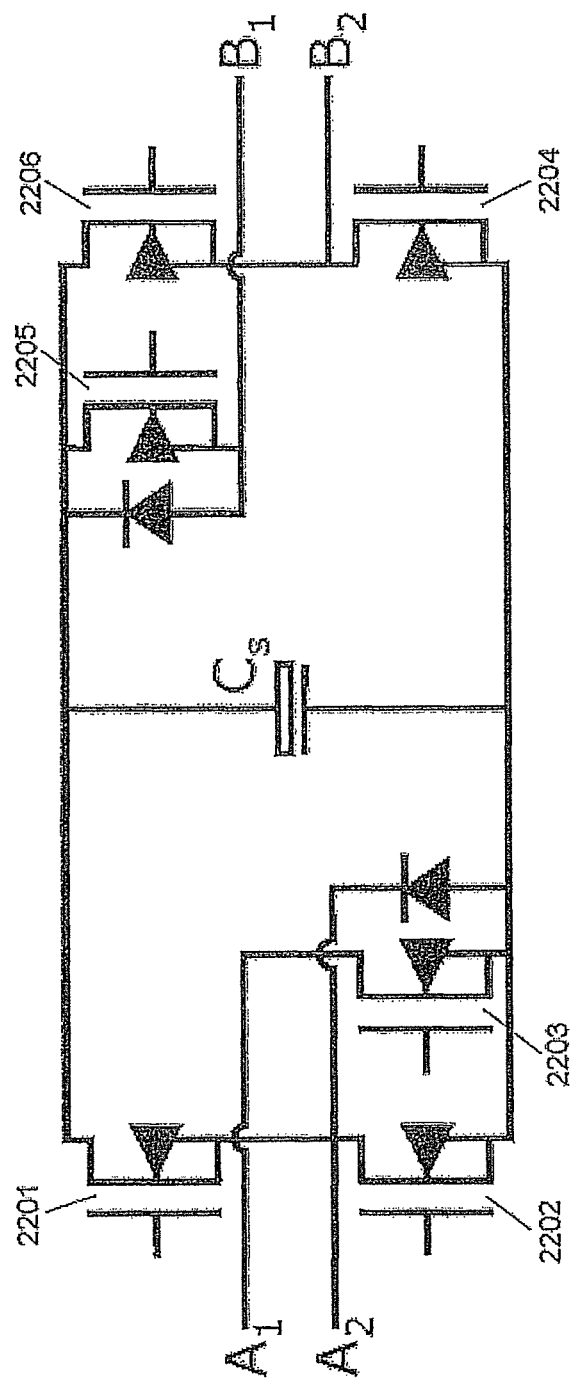
FIG. 22 shows a further possible embodiment that is derived from the circuit diagram of FIG. 21 but allows fewer switching capabilities.
Figure 23:
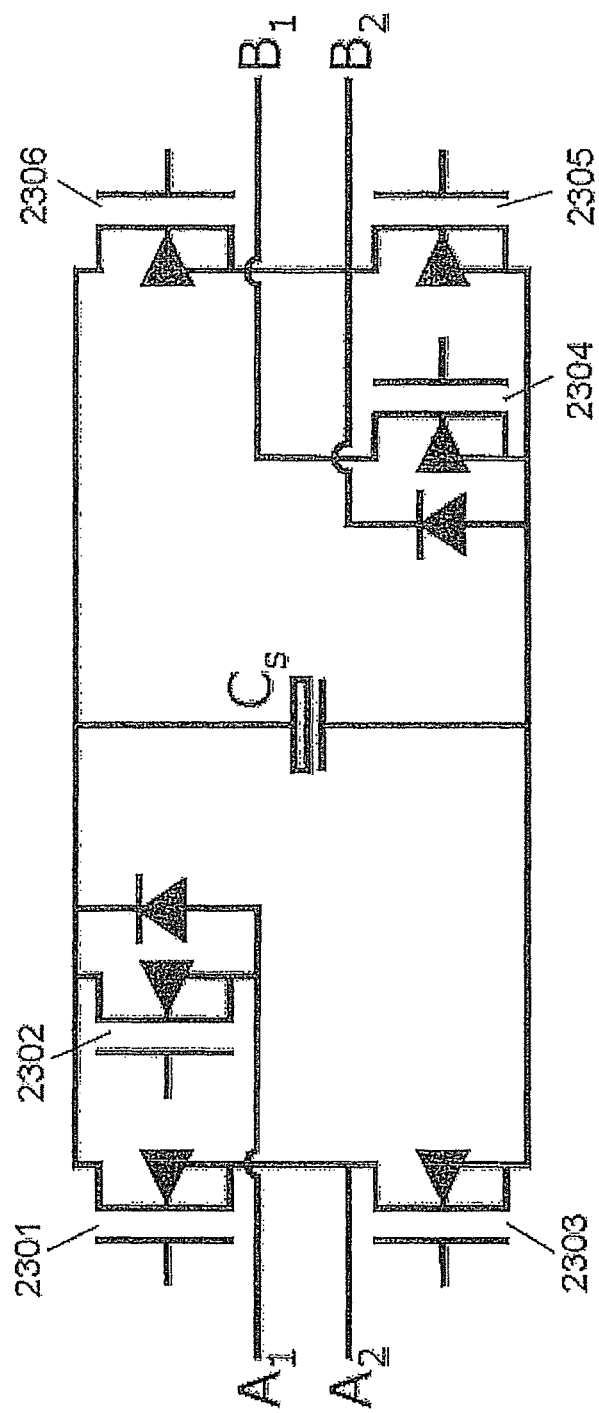
FIG. 23 shows a further possible embodiment that is derived from the circuit diagram of FIG. 21 but allows fewer switching capabilities.

FIGS. 22 and 23 illustrate further individual modules that may be derived from the first module type of FIG. 21a in the manner described. A common feature of all of these individual modules that are derived from the first module type is that it is possible for the energy storage elements thereof to be connected selectively in series or in parallel. These derived individual modules also make it possible to uncouple the energy storage element from the current flow, that is to say a current flow through the individual module in question, without current thereby passing through the energy storage element itself, in this case the capacitor, or without the storage element absorbing or releasing any energy. Further examples of individual modules that may be derived from the module type 1 of FIG. 21a will be described in greater detail with reference to FIGS. 29-32.

Second Module Type

Figure 21B:
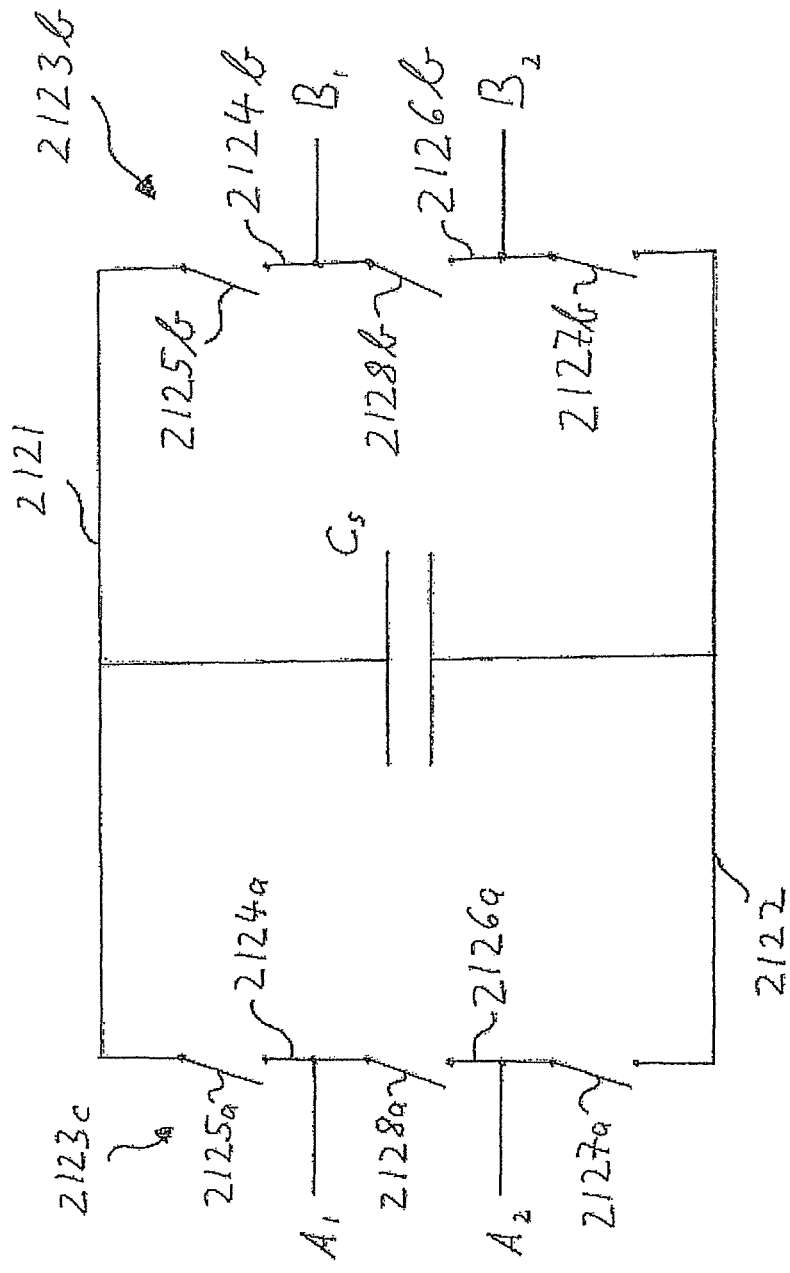
FIG. 21b is a schematic diagram of a second module type.

FIG. 21b shows the circuit arrangement for a second module type, from which individual modules according to the invention may also be derived. The second module type also comprises a first and a second conductor 2121, 2122, an energy storage element (capacitor $C_S$) and two bridge branches 2123a, 2123b, which are connected between first and second conductors 2121, 2122. Unlike the first module type of FIG. 21a, however, in this case each bridge branch 2123a/b includes two pickups, specifically a first pickup 2124a/b, which is connectable to first conductor 2121 via a first switching element 2125a/b, and a second pickup 2126a/b, which is connectable to second conductor 2122 via a second switching element 2127a/b. Finally, each bridge branch 2123*a/b* contains a third switching element 2128*a/b*, via which the first and second pickups 2124*a/b*, 2126*a/b* may be connected to each other.

One terminal $A_1$, $A_2$ of each terminal pair is connected to the first or second pickup 2124*a*, 2126*a* of first bridge branch 2123*a*. In the same way, one terminal $B_1$, $B_2$ of each second terminal pair is connected to the first or second pickup 2124*b*, 2126*b* of second bridge branch 2123*b*.

The second module type also enables energy storage element $C_S$ to be connected selectively in series or in parallel, separation of energy storage element $C_S$ from the current flow (also called "bypass" or "zero volt mode") and also operation in all four quadrants of the current voltage domain. Further individual modules according to the invention can also be derived from the second module type by removing individual switching elements or replacing them with conductors, wherein it is still possible with the remaining switching elements for the energy storage element to be connected selectively in series or in parallel with an energy storage element of an adjacent module. Examples of individual modules that may be derived from the second module type of FIG. 21*b* were shown in FIG. 9*a*, FIGS. 15, 16 and 17.

Whereas the modules of the first and second types and a large number of individual modules derived therefrom enable operation in all four quadrants of the current-voltage domain, individual modules of such kind may also be derived that enable series/parallel connection of the energy storage element, but do not allow four-quadrant operation. Such modules are referred to in the following as "two-quadrant modules" and will be described later with reference to specific embodiments thereof. The loss of four quadrant operation means that further switching elements may be saved. At the same time, there are many applications in which two-quadrant modules are entirely sufficient, particularly back-to-back systems with DC voltage intermediate circuits, unidirectional point-to-point DC voltage links, particularly in wind energy applications, and certain correction systems.

Third Module Type

Figure 21C:
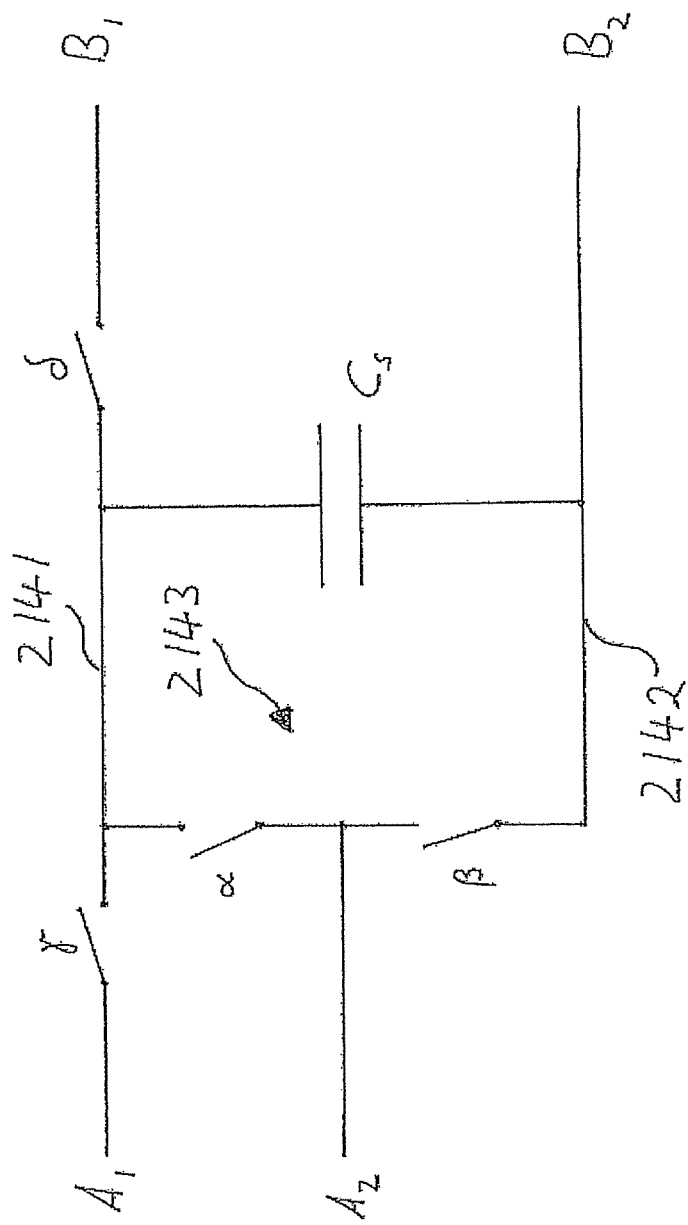
FIG. 21c is a schematic diagram of a third module type.

FIG. 21*c* shows a third module type, which is specially suited to two-quadrant operation. The third module type also comprises a first and a second conductor 2141, 2142 and an energy storage element $C_S$ that is connected between first and second conductors 2141, 2142. The third module type further comprises a bridge branch 2143 that is arranged between first and second conductors 2141, 2142. Bridge branch 2143 comprises a pickup 2144, which is connectable to first conductor 2141 via a first switching element α and to second conductor 2142 via a second switching element β. In this arrangement, a terminal $A_1$ of the first terminal pair is connected to pickup 2124, and the other terminal $A_2$ of the first terminal pair is connectable to first conductor 2141 via a third switching element γ. In addition, a terminal B1 of second terminal pair is connectable to first conductor 2141 via fourth switching element δ, and the other terminal $B_2$ of the second terminal pair is connected to second conductor 2142.

The structure of the third module type according to FIG. 21*c* allows the following states: separation of energy storage element $C_S$ from the current flow ("bypass" or "zero volt mode"), connection in series (one polarity is sufficient) and the capability for parallel connection with correct polarity.

As may be seen in FIG. 21*c*, the third module type only comprises four switching elements α, β, γ and δ. As will be explained in more detail later, yet further simplified modules may be derived from this third module type by dispensing with one of the switching elements γ, δ, so that the individual module is able to function even with just three switching elements.

Embodiments of Two-Quadrant Modules

Figure 24:
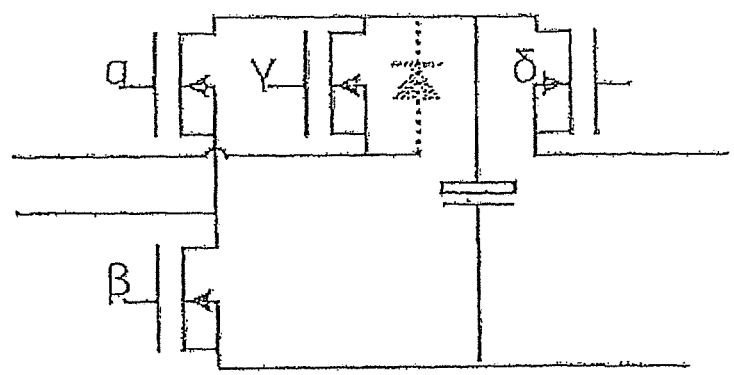
FIG. 24 shows a two-quadrant module of the third module type, in which the switching elements are in the form of transistors.
Figure 25:
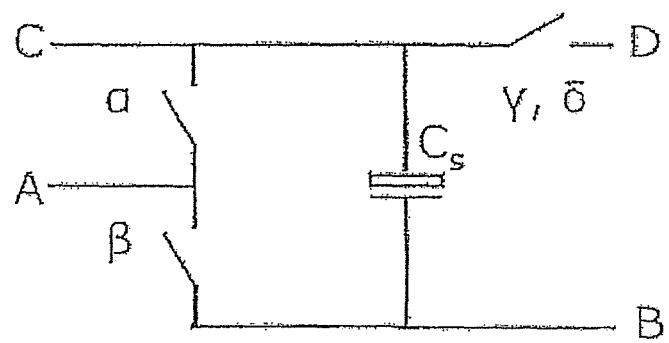
FIGS. 25 and 26 show individual modules derived from the third module type according to FIG. 21c.
Figure 26:
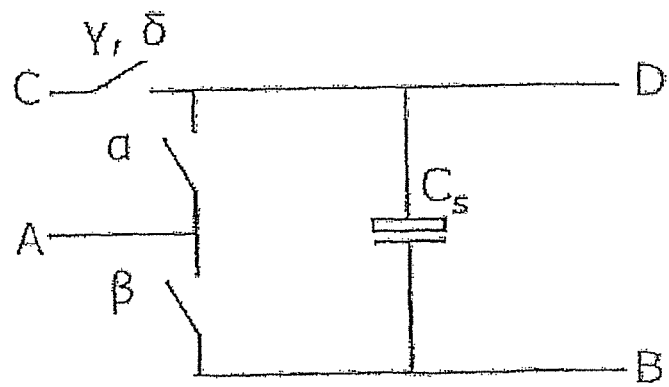

FIG. 24 shows a variant of the third module type in which switching elements α, β, γ and δ are in the form of transistors. In FIG. 24, the freewheeling diode for transistor γ is shaded in grey to show that this is an optional component. FIGS. 25 and 26 show individual modules that are derived from the third module type of FIG. 21*c*. In this context, one of the two switching elements γ, δ is dispensed with and the remaining switching element is replaced with a bidirectional switch. In FIGS. 25 and 26, the remaining switching element is identified with reference signs γ, δ to indicate that this bidirectional switch is performing the function of the two switching elements γ, δ of the third module type of FIG. 21*c*. This switching element is therefore also not equipped with a freewheeling diode. As described before, MOSFETs, IGBTs, GTOs, relays and similar may be used as switching elements.

Figure 27:
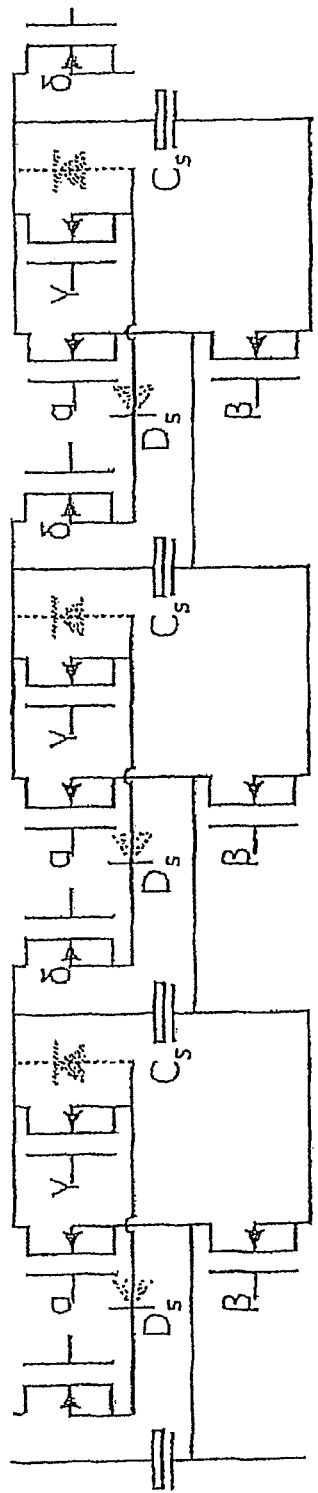
FIG. 27 shows a cascade connection of modules of FIG. 24.

FIG. 27 shows a cascade connection of modules from FIG. 24, that is to say of the third module type. Diode $D_S$ is again shaded in grey to indicate that this component could be omitted from this variant. Diode $D_S$ is only really needed in another variation which will be described with reference to FIG. 33, and in which both series-connected transistors γ, δ are replaced by a single transistor, that is to say γ or δ is closed permanently. However, parallel connection then only allows charge balancing in one direction. If γ or δ is replaced with a bidirectional switch, diode Ds can also be omitted and the current can flow in both directions.

From FIG. 27 it may be seen that the total topology of the cascade connection is "modular" in the sense that certain component groups are repeated. However, in some applications it is to some degree a question of definition as to which components are to be assigned to which module, or—in other words—where the boundaries should lie between adjacent modules. In the present disclosure, therefore, the term "module" is to be interpreted broadly and not necessarily limited to a discrete structural unit The term "module" is rather used very generally to denote subgroups of the circuit topology, that is to say certain component groups within a circuit. On the other hand, the "modules" in certain embodiments may indeed be structurally separate units, which may be plugged into each other and are easy to replace and manufacture, for example.

FIG. 27 also includes a connection table of the cascade connection of FIG. 27. The left column of the connection table describes the mode, namely "parallel", "series", "passive" (all switches open) and "zero", which denotes "zero volt mode" or "bypass mode". The right column names the transistors that are connected in conducting manner in the corresponding mode. It should be noted that the nature of passive mode is such that energy constantly flows into the energy storage element regardless of the external voltage.

If two transistors γ and δ are used, as shown in FIG. 27, it is even possible as part of the parallel connection to specify the possible balancing direction between charges of the capacitor in adjacent modules by activating only one of the two transistors, the opposite direction being suppressed by the freewheeling diode of the other transistor.

Figure 28:
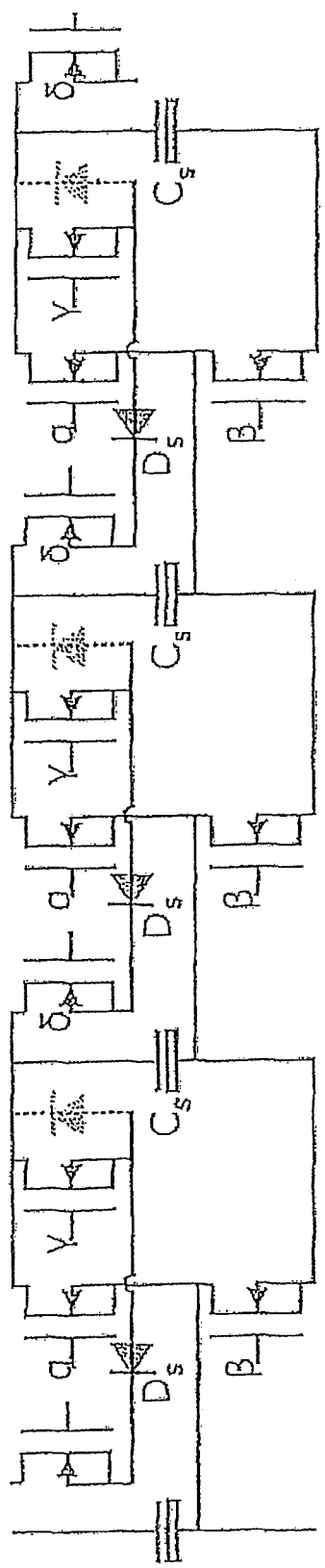
FIG. 28 shows a cascade connection similar to FIG. 27, but with opposite polarity.

The topology of FIG. 27 requires only a very small number of semiconductor elements (four per individual module), and these need only be dimensioned for the single module voltage. Load balancing between capacitors of adjacent modules is possible bidirectionally and, as was mentioned previously, even its direction can be controlled, since the current direction is defined by transistors γ, δ. To this extent, the topology of FIG. 27 is especially attractive for converter systems, not only in terms of its functionality but also because of its relatively simple and inexpensive structure. However, the cascade connection shown in FIG. 27 is limited to two-quadrant operation. FIG. 28 has essentially the same topology as FIG. 27, but with the opposite polarity.

Figure 29:
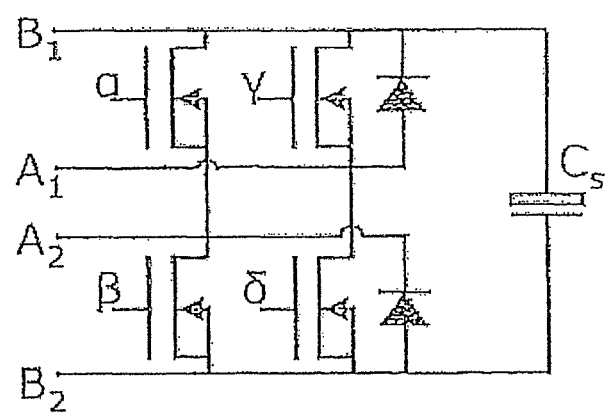
FIG. 29 shows a two-quadrant individual module that may be derived from the first module type.
Figure 30:
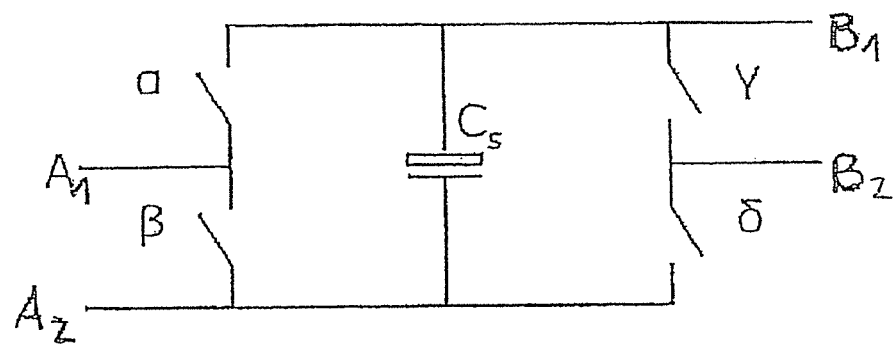
FIG. 30 shows the same topology as FIG. 29, but in which the transistors have been replaced with abstract switching elements.
Figure 31:
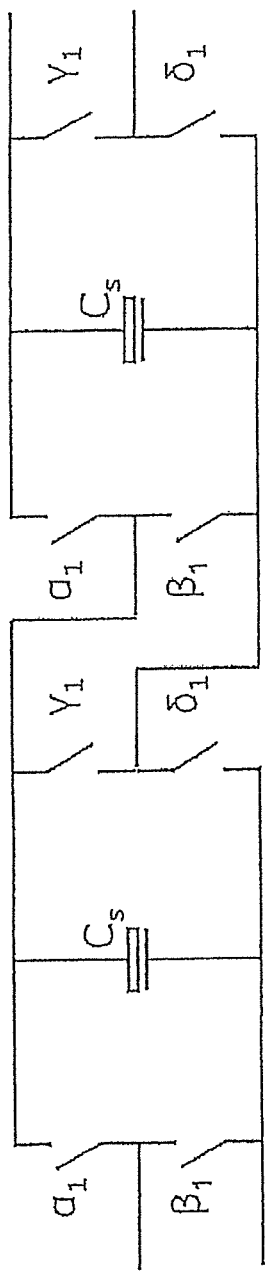
FIG. 31 shows two consecutively connected modules according to FIG. 30.
Figure 32:
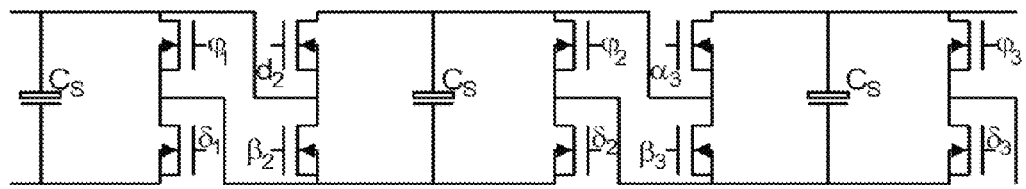
FIG. 32 shows a consecutive connection of two individual modules of FIG. 29, FIGS. 33 and 34 show a consecutive connection of other two-quadrant modules.

A further two-quadrant individual module is shown in FIG. 29. FIG. 30 shows the same topology, but in this case the transistors have been replaced with abstract switching elements. FIG. 30 also includes the associated switching table. FIG. 31 shows two modules according to FIG. 30 connected consecutively. FIG. 32 is equivalent to FIG. 31, in which however the abstract switching elements have been replaced with transistors, thus ultimately arriving at a cascade connection of two individual modules according to FIG. 29.

If FIGS. 29 and 30 are compared with FIG. 21a, it will be seen that the individual module of FIGS. 29 and 30 may be derived from the first module type, as it is represented in the abstract in FIG. 21a and in FIG. 21 with the introduction of specific transistors. As was stated previously with reference to FIG. 21a, a two-quadrant module may accordingly be derived from the general four-quadrant individual module of FIG. 21 or 21a ("first module type") module by omitting switching elements, and this too is able to fulfil its function with only four switching elements. This topology may alternatively be derived from the second module type of FIG. 21, and thus figuratively represents the smallest common denominators of the first and second module types.

As may be seen in FIG. 30, the bypass ("zero volts") circuit may be created in two different ways. Either the lower path is activated via switch δ or the upper path is activated via transistor α. In the case of transistors with bootstrap drivers, the first variant is preferred.

In the specific variant of FIG. 29, that is to say with transistors instead of abstract switching elements, the module functions in passive mode, i.e. without a transistor that has been switched conductive with respect to its terminals as a rectifier module with downstream connected polar capacitor.

Series connection may be initiated by activating one of the two switches β or γ. However, both paths may also be activated at the same time, which causes the channel resistance to fall correspondingly by half. A significant advantage of this micro topology is revealed here. Not a single transistor is superfluous, each transistor contributes to the channel width.

A parallel connection is created by activating switching elements α and δ. Again, the highest voltage that occurs for each transistor is always the simple module voltage, which makes the construction not only very sturdy and reliable, but also helps to avoid additional costs for disproportionately dimensioned power semiconductors.

Figure 33:
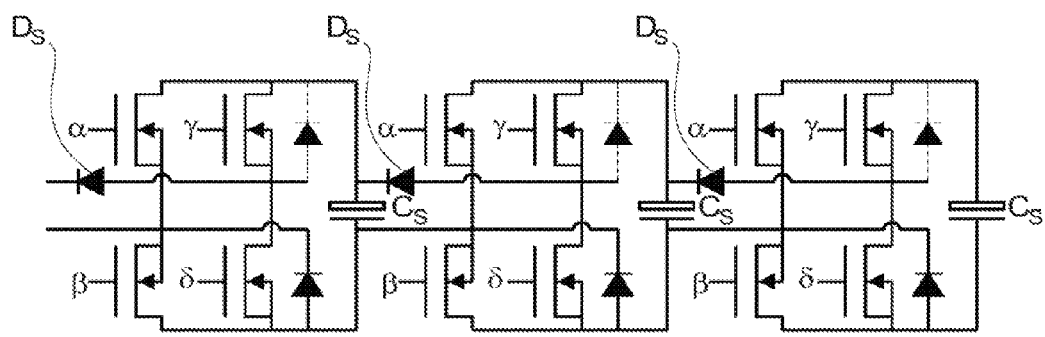
Figure 34:
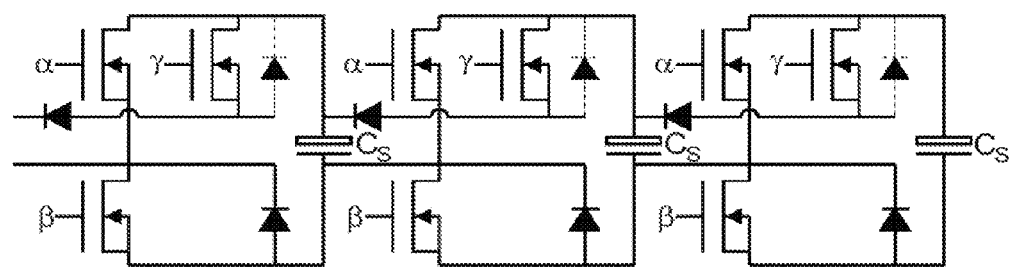

A further embodiment is shown in FIG. 33. Diode $D_S$ is optional and may be used to prevent short circuits although in this case only one current direction is possible. If diode $D_S$ is used, transistor δ may be dispensed with, in this case an individual module may be realised having just three transistors, see FIG. 34.

Figure 35:
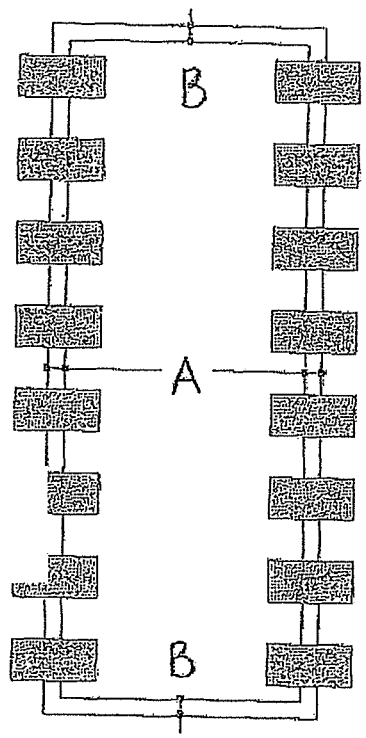
FIGS. 35-37 shows macrotopologies in which a plurality of two-quadrant individual modules are interconnected, FIG. 38($a$)-($d$) show alternative energy storage elements, FIGS. 39($a$) and ($b$) show alternative energy storage elements, FIGS. 40($a$) and ($b$) show individual modules in which the energy storage elements of FIGS. 38($c$) and 38($d$) are used.
Figure 36:
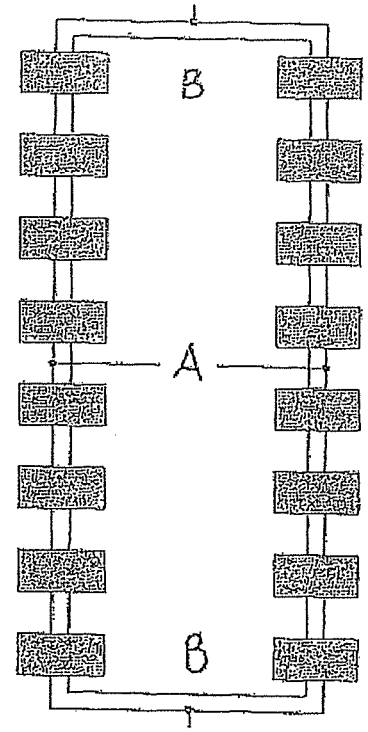
Figure 37:
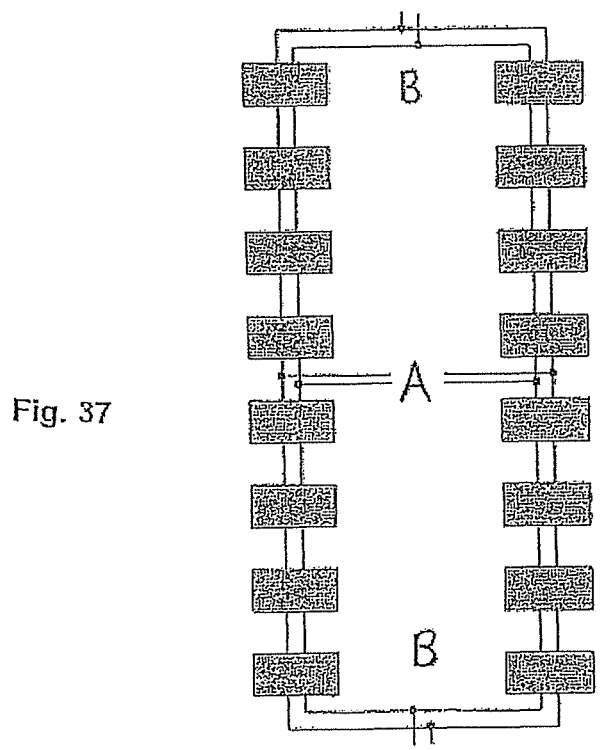

FIGS. 35-37 show macrotopologies in which a plurality of two-quadrant individual modules (shown as grey boxes in the figures) are wired for connecting two single-phase systems A and B, hereinafter also referred to as "consumers". If the energy balance does not exhaust the storage capacity, this system too may determine any, even dynamic, current-voltage characteristics regarding the external connections and terminal pairs, and thus also imitate any component behaviour. This means that although the individual modules are limited to two-quadrant operation, the macrotopology of the overall system of FIGS. 35-37 may nevertheless be designed as a four-quadrant system, that is to say to handle current flows in both directions and in bipolar manner at all terminal pairs that are visible from the outside. For example, if the bottom left bridge branch in FIG. 35 is set to $4 \cdot V_{module}$ (in which case the upper branches will compensate to prevent a loop current) and the bottom right bridge branch is set to 0V, a voltage of $4 \cdot V_{Module}$ is generated between the terminals of terminal pair A. Conversely, if the bottom left bridge branch is set to 0V and the bottom right bridge branch is set to $4 \cdot V_{module}$ a terminal voltage of $-4 \cdot V_{module}$ is generated.

Three options are shown for connecting the overall system to the terminal pairs of consumers A and B: according to FIG. 35, the terminals may be joined at the ends of a converter arm. This corresponds to the situation of FIGS. 11-14, in which the terminals of the first terminal pair of the first individual module and the terminals of the second terminal pair of the last individual module of the cascade connection are connected to each other. This is particularly beneficial if the consumers are purely conventional sources or drains that are only connected via two contacts.

Alternatively, however, according to the second option of FIG. 36 it is also possible to connect conventional sources/drains to only one terminal of the individual module in each case. This option offers the advantage that a parallel connection and thus also both charge balancing and increased current carrying capacity beyond a phase module are possible.

Finally, FIG. 37 shows a case in which consumers A, B are themselves capable of handling the four-terminal network system. In this case, each consumer A, B then has an input with four contacts.

Figure 43:
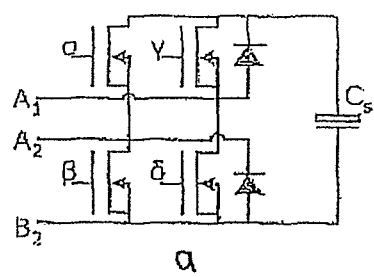
Figure 43:
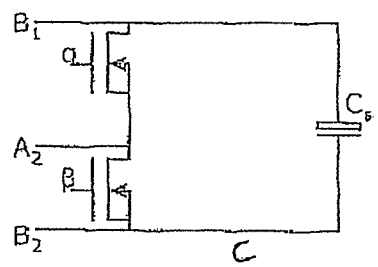
Figure 43:
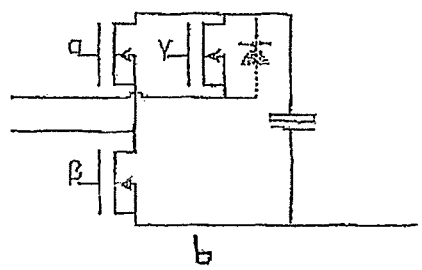
Figure 43:
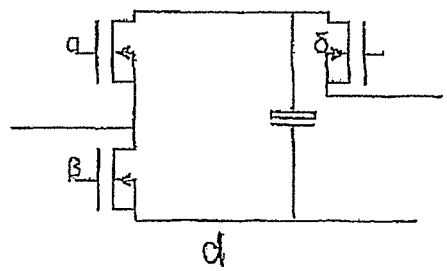

If the last or first terminal pair of the cascade connection of FIG. 35 are connected together, special terminating modules may also be used, and one of the module pickups may be dispensed with. Exemplary terminating modules are shown in FIG. 43(a)-(d). FIG. 43 shows the "right-side terminating" and "left-side terminating" modules, wherein of course the terms "right-side" and "left-side" only refer to the chosen graphical representation.

The individual modules described in the present document may also be combined with classic two-terminal modules as suggested by R. Marquardt. Two-quadrant and four-quadrant modules of the type described here may also be combined.

Moreover, the individual modules shown here may also be embedded in "hybrid converters" such as are described for example in Feldman, Tomasini, Clare, Wheeler, Trainer, Whitehouse (2010). *A hybrid voltage source converter arrangement for HVDC power transmission and reactive power compensation*. PEMD 2010, doi:10.1049/cp.2010.0093. Such a hybrid converter avoids the classic macrotopology consisting of phase modules and converter arms and uses classic IGBT switches in parallel with the modules. A similar hybrid converter is also disclosed in WO 2011/015227. A further hybrid converter is known from WO 2010/149200, the switch is introduced into the converter arms of the Marquardt topology.

In the embodiments described in this document, the energy storage element was always in the form of a single capacitor $C_S$. However, this is to be seen as purely for exemplary purposes and not limiting of the present invention. In particular, an "energy storage element" in the sense of the invention many also consist of a plurality of components, particularly a plurality of capacitors, which may also be equipped with other switching elements. A few examples of such are provided in FIGS. 38 to 42.

Figure 38:
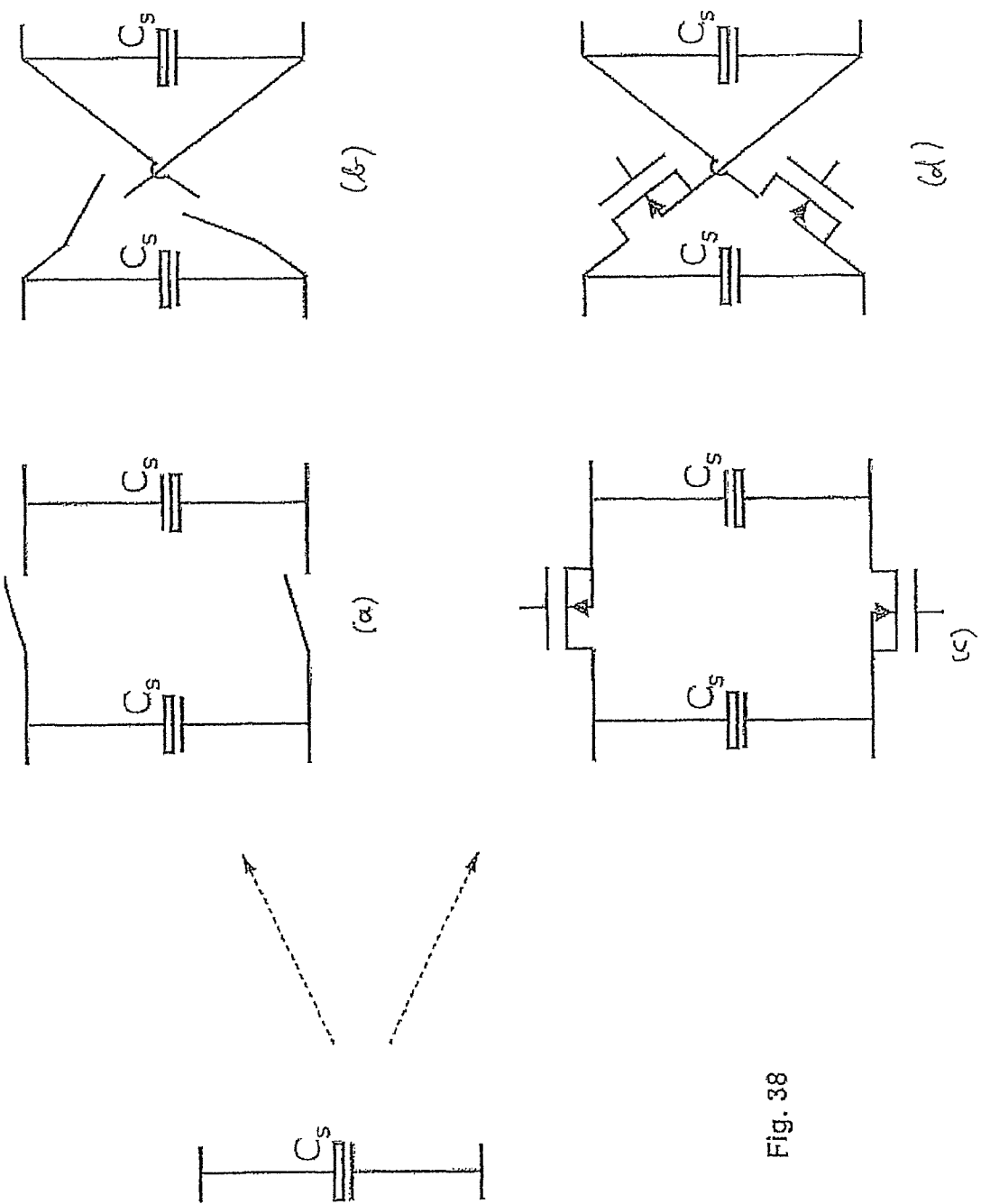
Figure 39:
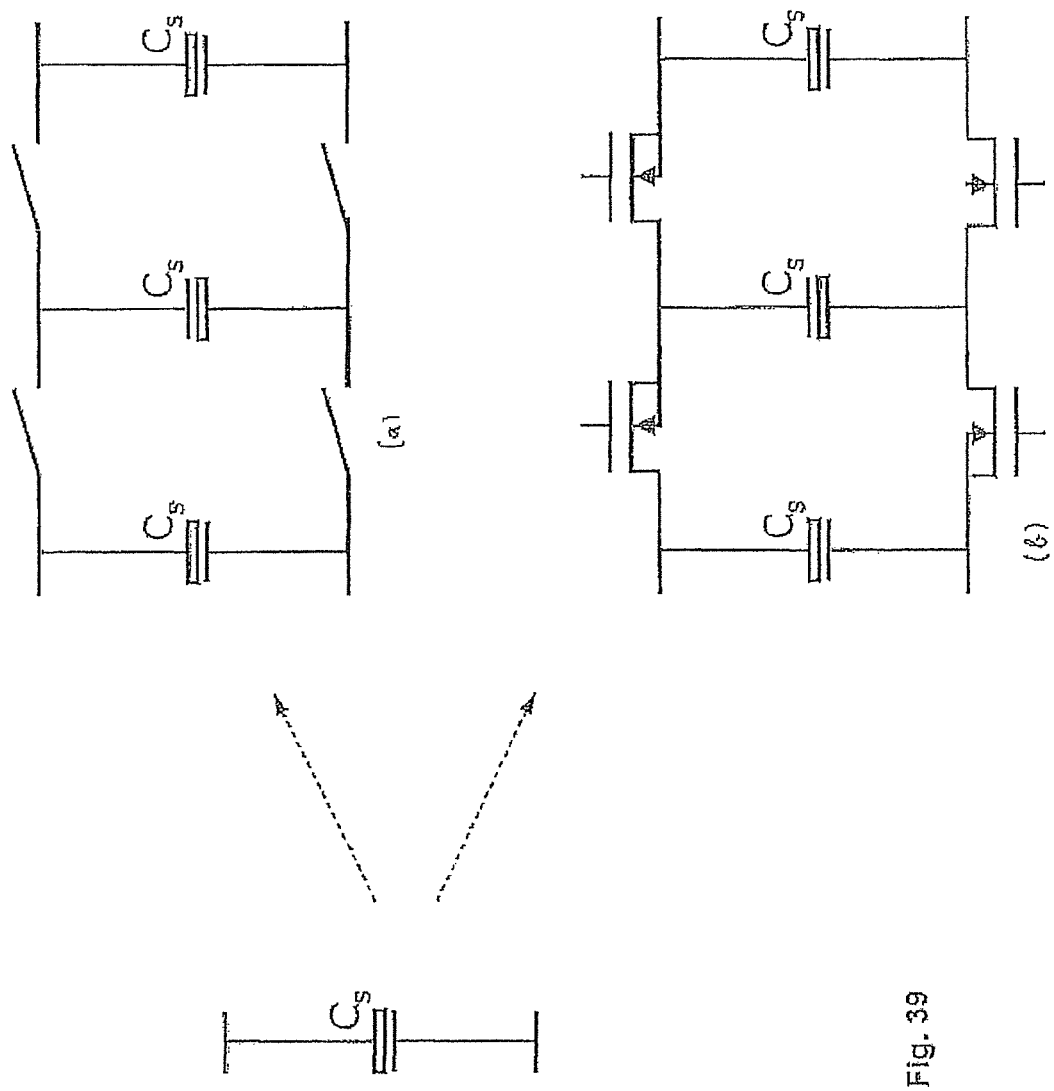
Figure 40:
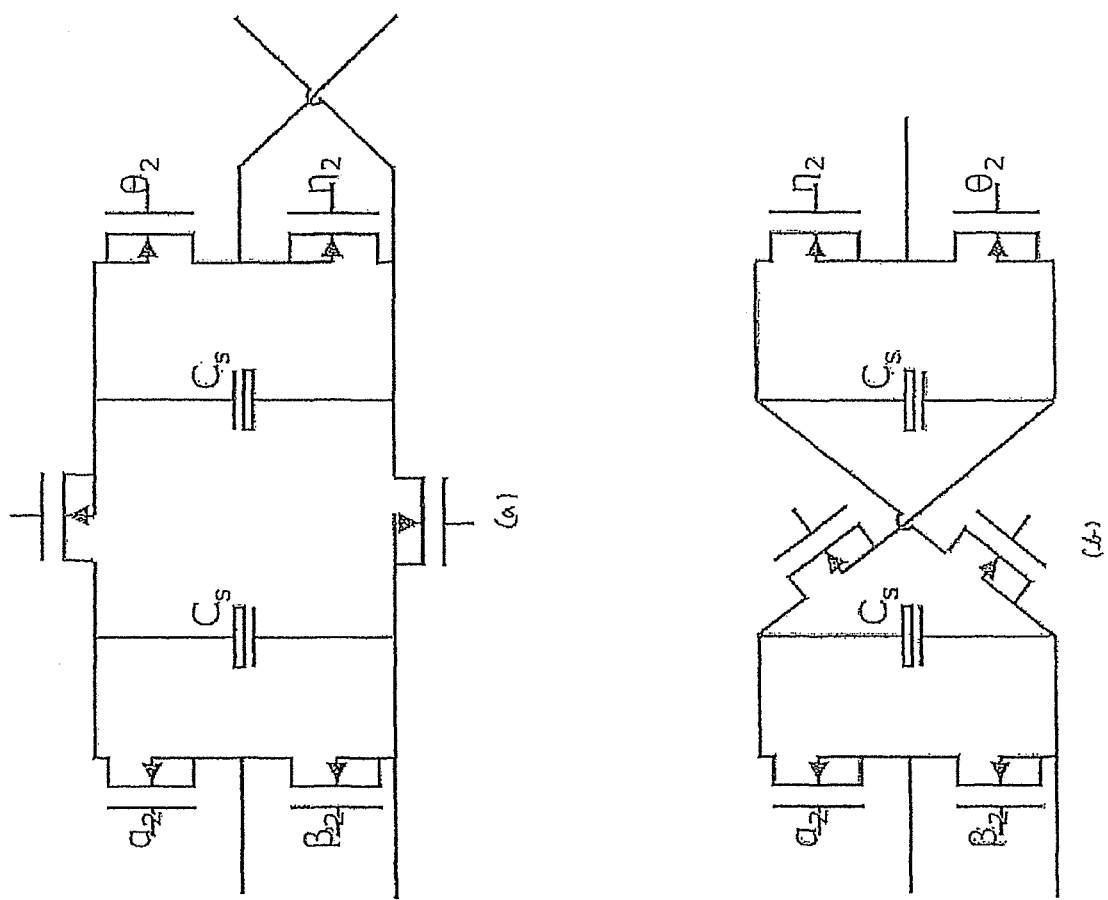

FIG. 38 is a diagrammatic representation of the way a single capacitor, which in the embodiments described was always used as the energy storage element, may be replaced by interconnecting two capacitors. This replacement is illustrated by the dashed lines. FIG. 38(a) shows an arrangement with two capacitors $C_S$ of which the polarity has been reversed. FIG. 38(b) shows a circuit that is equivalent to this case. FIGS. 38(c) and 38(d) show specific embodiments in which the abstract switching elements have been replaced by transistors. In this illustration, the opposing freewheeling diodes were omitted for the sake of simplicity.

FIGS. 39(a) and 39(b) show a refinement of the structure of FIG. 38 on three capacitors. Of course, any number of capacitors may be used in order to generate energy storage elements with a large number of voltage levels.

Figure 41:
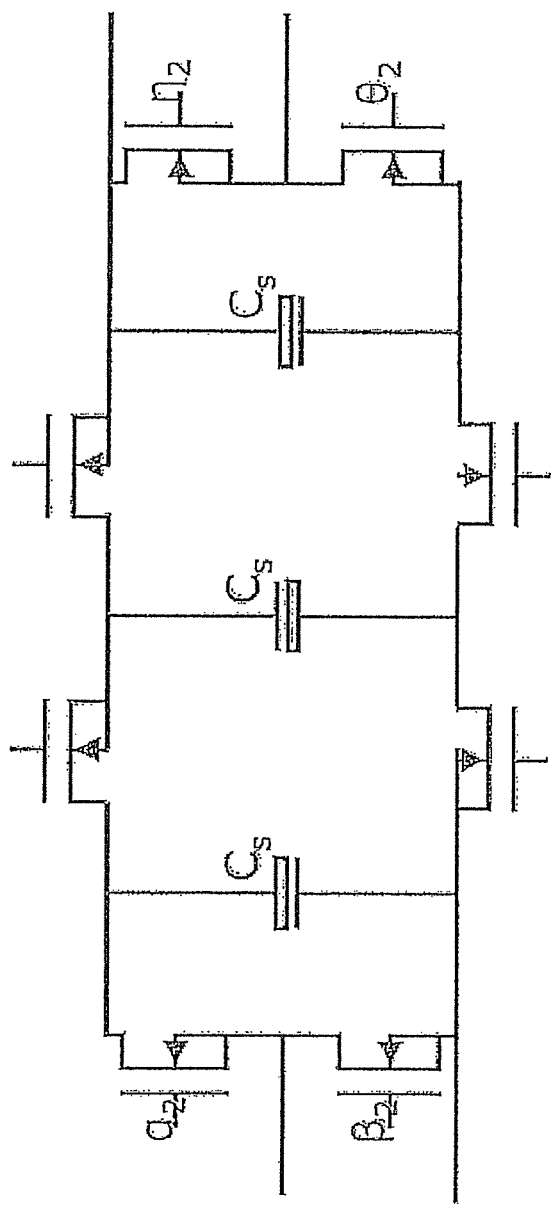
FIG. 41 shows an individual module in which the energy storage element of FIG. 39($b$) is used, FIGS. 42($a$) and ($b$) shows further embodiments of energy storage elements, and FIG. 43($a$) to ($d$) shows terminating modules for a cascade connection of individual modules.
Figure 42:
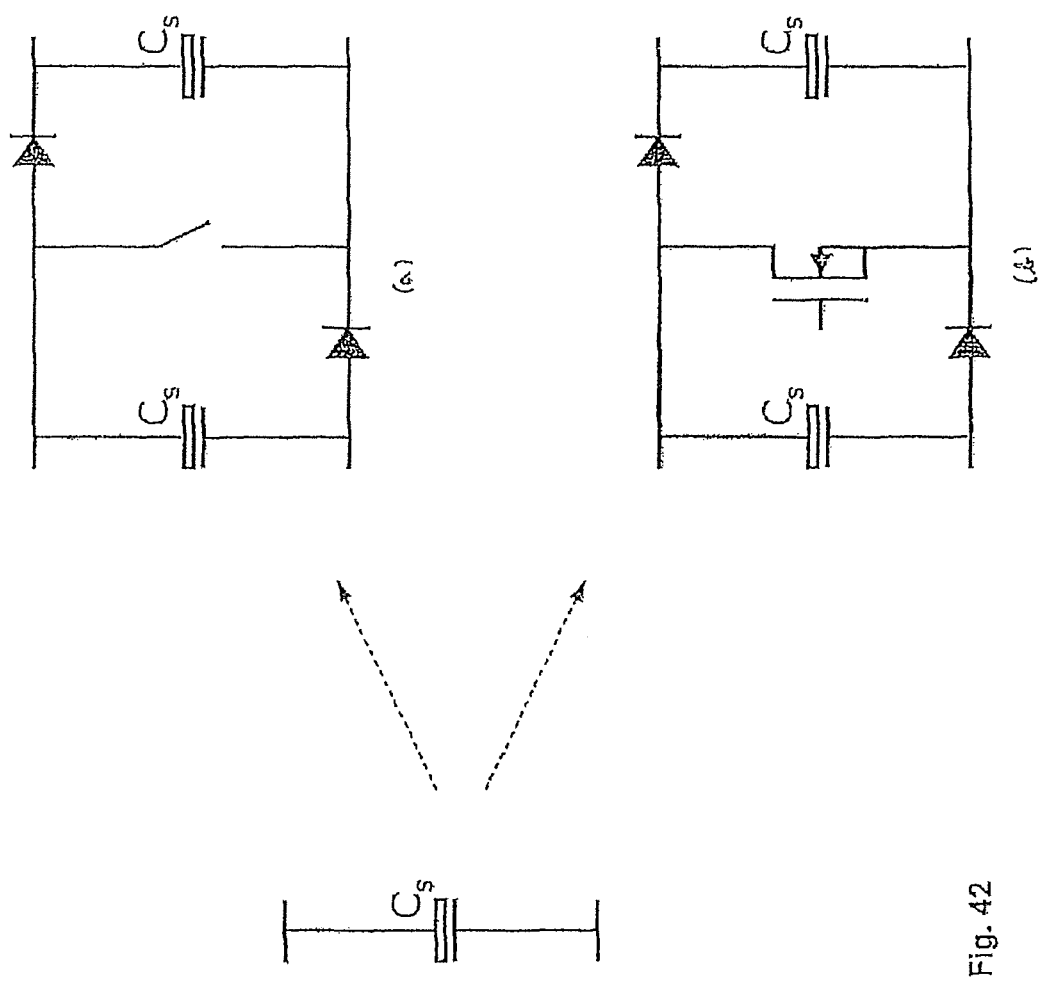

FIGS. 40(a) and 40(b) show individual modules in which the energy storage elements of FIGS. 38(c) and 38(d) are used. FIG. 41 also shows an individual module, in which the energy storage element of FIG. 39(b) is used.

FIG. 42(a) shows a further example of an energy storage element with abstract switching elements, and FIG. 42(b) shows the same energy storage element, in which the switching element has the form of a transistor (the freewheeling diode has been omitted for the sake of clarity). This energy storage element also includes two further voltage values in addition to the zero volt state.

Control of Individual Modules

Each individual module should be controlled by its own dedicated control unit that is connected to a common control unit via a potentialless bidirectional data channel, for the purpose of controlling the switching elements and also forwarding the voltage values of the energy storage element to the control unit. Alternatively, additional data such as currents or component temperatures may be transmitted to the control unit. It is particularly advantageous if the control units in the individual modules receive electric power via the voltage at the terminals of the individual modules. Data transmission to the common control unit may be for example optical, in order to ensure electrical isolation. If modularity is dispensed with entirely, the option exists to combine control systems, which includes a potential for simplifying construction and cost savings. For example, in the case of transistor-type switches all switching elements with the same source contact may be combined in the potential-isolated controller.

External Interconnection of Modules

Since it offered maximum flexibility, a full bridge for full four-quadrant was the standard choice for previously known modular multilevel approach. In particular, it allowed all modules to be supplied with energy constantly from both input sides. However, the new development might also render other structures. If all four quadrants of the current-voltage level are not needed, a reduction of the four arms to a simpler structure, might lead to cost savings in many cases. The option of parallel interconnection would mean that charge transport away from the modules would always be possible.

In order to enable low-loss parallel connection of the energy storage elements even with different voltages of these element, charge and voltage balancing should be performed before the parallel connection. For this purpose, it is practical to connect additional balancing elements between each two individual modules, enabling intermediate storage of some of the energy from the energy storage elements. In particular, such balancing elements may contain inductances.

Advantages of the Invention

The switch (e.g. transistor) of each individual module according to FIG. 9a, which connects the two connectors B1 and B2 (or alternatively the two connectors A1 and A2) is designed according to the redundancy principle of modular design, like all other switching elements. If the controller is designed in the same way, in the event of a malfunction (in the case of semiconductor switches this usually leads to a short circuit and accordingly to a low-resistance permanently closed state) it will be able to continue working without significant limitations. The only switching option that is lost in such a case is the parallel connection of the two adjacent individual modules. Thus, a malfunction does not have to entail any downtimes. The controller can also close the two current rails via a (slow) relay to relieve the load on the faulty switch and issue a repair order for the medium term replacement of the individual modules/transistor.

The design of the components only has to be specified for the module voltage, which means that converters with very high electric strengths can be constructed from a plurality of individual modules. Additional symmetries are not necessary in this context.

The switching topology of the individual modules ensures overvoltage protection for inputs and outputs (low-pass effect) by the energy storage elements.

Failsafe performance through use of redundancies in the controller.

The option offered by the design according to the invention to connect the energy storage elements selectively in series or in parallel enables converters with a high voltage ratio (and corresponding current ratio) between input and output terminals to be built. Such a system has significantly lower losses than previous converters, because at a lower voltage a number of modules are connected in parallel. Ohmic losses particularly from the energy storage elements, but also from the switching elements, are reduced.

Converters with strongly inductive or strongly capacitive loads can also be operated with reduced current heat losses as compared to conventional systems, since these loads generate high currents (leading to current heat losses) with low voltages, so that it is possible to connect the individual modules in parallel in these time periods.

Individual bridge branches (i.e. the connection in series of multiple modules) can already be used for effective power factor correction.

Selective parallel and serial switching allows (clocked) charge balancing among the energy storage elements of different modules without passing a current over the entire converter or even beyond the inputs and outputs. This application is very beneficial both when using capacitors and when using accumulators as energy storage elements.

Simple, sturdy, self-extinguishing switching elements can be used for the crossbar connection in the individual modules.

Option of other module connections through use of parallel connection as "bucket chain".

Application Areas of the Invention

Because of properties such as simple scalability, this system lends itself well to an extremely wide range of applications ranging from low voltage conversion and automotive applications to high and highest voltage levels (railways, HVDC/HGÜ systems, network coupling, power compensation, network coupling with different voltages and frequencies etc.).

For example, the last few years have seen the development and construction of more and more systems for low-loss power transmission over very long distances in the highest voltage range for HVDC/HGÜ systems. Such systems are considered to be a great hope for the future of energy supply worldwide should it be impossible to conduct "energy recovery", from solar energy for example, in the vicinity of consumers (see projects such as European supergrid, or DESERTEC), but due to their enormous power and central position—and after all an unlimited number of users—they are very expensive but also valuable resources. At the same time these new renewable energy resources require additional large energy storage facilities, since the energy cannot be produced in the required amount immediately when it is requested by the consumer. According to the current state of knowledge, storage systems may best be based on hydropower (pumped storage power plants), which are rather more easily established in the cooler regions of Europe. Thus, here too, it would be necessary for the corresponding energy connection to span long distances, which is another reason HVDC/HGÜ systems are appealing.

The optional parallel and series connection of individual modules is also particularly advantageous for converters that deliver (or absorb) a highly variable voltage while maintaining consistently high output at at least one pair of terminals. This is the case for example, in electric vehicles, in which high torques (and therefore high currents) are needed at start-up with relatively low supply voltages, and on the other hand rather small torques (and therefore low currents) with correspondingly higher operating voltages are required for normal driving conditions.

Another possible field of application is nerve stimulation with magnetic fields according to the induction principle. A coil placed on the tissue to be stimulated generates a magnetic field pulse on the basis of a current pulse with suitable waveform so that a current flow is passed into the tissue by inductance. The coil current and the induced coil field are dimensioned such that the current pulse is sufficient to depolarise the nerves and thereby trigger an action potential. This method is almost completely pain-free and therefore allows many applications in medicine. However, in previous inductive stimulus methods only very simple resonant oscillation circuits were used for pulse generation, and the sinusoidal pulses thereof are not energetically optimal. The use of a converter, however allows the generation of correspondingly shaped, temporally optimized current pulses, so it would be possible to reduce the energy required for nerve stimulation could be reduced considerably. Since an inductive load, namely the stimulation coil, must be energised in this application as well, converters are particularly suitable for the concept described according to the invention.

The invention claimed is:

1. An electrical converter system for power supplies, comprising a plurality of identical individual modules in a cascade connection, characterised in that
    each individual module has at least three, preferably at least four internal switching elements, at least one energy storage element and at least four connectors, wherein the connectors serve in pairs as a first and a second terminal pair; and
    at least two individual modules are cascade connected in such manner that each of the connectors of the second terminal pair of a preceding individual module is connected with
        either the connectors of the first terminal pair of the respective following individual module, or
        connectors of at least one intermediate module, which is arranged between the preceding individual module and the respective following individual module,
    wherein the switching elements of the respective individual modules in the cascade connection of the at least two individual modules connect their respective energy storage elements to the terminals of the cascade connection thereof in such manner that the energy storage elements of each individual module may be selectively connected to the energy storage element of a subsequent individual module either in parallel or in series, thereby allowing control of a consecutive connection of several individual modules in such a manner that at least one series connection of energy storage elements and at least one parallel connection of energy storage elements is present simultaneously in such consecutive connection, and
    wherein a diode is additionally arranged parallel to each switching element, the diodes being connected in such manner that they protect the switching elements from polarity reversal and overload.

2. The electrical converter system according to claim 1, in which at least one terminal of the first terminal pair of the first individual module of the cascade connection and at least one terminal of the second terminal pair of the last individual module of the cascade connection serve as terminals of the cascade connection.

3. The electrical converter system according to claim 1, in which the internal switching elements of each individual module are designed in such manner that they can selectively connect one or both connectors of a terminal pair to the energy storage element.

4. The electrical converter system according to claim 1, in which the individual modules are each designed in such manner that a connector of the first terminal pair is connected internally with a connector of the second terminal pair.

5. The electrical converter system according to claim 1, wherein the switching elements are in the form of bipolar transistors, IGBTs, MOSFETs, thyristors or GTOs.

6. The electrical converter system according to claim 1, in which the diodes are connected in such manner that when all switching elements are open energy can only flow into said energy storage element.

7. The electrical converter system according to claim 1, wherein the converter system operates according to the pulse width modulation principle and the current strength is altered via the duty cycle of the pulse width modulation.

8. The electrical converter system according to claim 1, wherein the energy storage element is designed as a capacitor, an accumulator or a solar cell.

9. The electrical converter system according to claim 1, wherein the switching elements of an individual module of a cascade connection can also be controlled in such manner that no current can flow through the energy storage element or that no electrical connection with a following individual module is present.

10. The electrical converter system according to claim 1, wherein the cascade connection of individual modules also contains additional modules with other properties.

11. The electrical converter system according to claim 1, in which the at least one intermediate module has the form of a balancing member for intermediate buffering of energy from the energy storage element, wherein said balancing member preferably has an inductance.

12. The electrical converter system according to claim 1, wherein the cascade connection of the individual modules forms a bridge branch of a converter.

13. The electrical converter system according to claim 12, in which the terminals of the first terminal pair of the first individual module of the cascade connection are connected to one another and form a first terminal of the bridge branch, and the terminals of the second terminal pair of the last individual module of the cascade connection are connected to one another and form a second terminal of the bridge branch.

14. The electrical converter system according to claim 12, wherein the individual modules of a bridge branch that are in the middle are designed with a lower current carrying capacity than the individual modules that are arranged closer to the ends of the bridge branch.

15. The electrical converter system according to claim 12, wherein the bridge branch formed by a pulse width modulated actuation of the individual modules offsets the phase of the current of an AC voltage source relative to the voltage thereof in such manner that the bridge branch can be used for power factor correction.

16. The electrical converter system according to claim 12, wherein bridge branches are connected in pairs to form a phase module and a plurality of such phase modules are connected together to form a common busbar in order to connect the input and/or output side of the converter to a multiphase system.

17. An electrical converter system for power supplies, comprising at least two identical individual modules in a cascade connection, wherein
each individual module has at least three, preferably at least four internal switching elements, at least one energy storage element and at least four connectors, wherein the connectors serve in pairs as a first and a second terminal pair; and
at least two individual modules are cascade connected in such manner that each of the connectors of the second terminal pair of a preceding individual module is connected with
either the connectors of the first terminal pair of the respective following individual module, or
connectors of at least one intermediate module, which is arranged between the preceding individual module and the respective following individual module,
wherein the switching elements of the respective individual modules in the cascade connection of the at least two individual modules connect their respective energy storage elements to the terminals of the cascade connection thereof in such manner that a selectively series or parallel connection of energy storage elements is made in which the individual module can be derived from one of a first, a second and a third module type,
wherein the first module type comprises the following:
a first and a second conductor,
an energy storage element-G, connected between the first and the second conductor,
four bridge branches, connected between the first and the second conductor,
wherein each bridge branch comprises a pickup that may be connected to the first conductor via a first switching element and to the second conductor via a second switching element, and
wherein each of the at least four connections of the individual module is connected to one of the pickups on the four bridge branches;
wherein a module of the second module type comprises the following:
a first and a second conductor,
an energy storage element, connected between the first and the second conductor,
two bridge branches connected between the first and the second conductor, wherein
each bridge branch comprises a first pickup that may be connected to the first conductor via a first switching element a second pickup that may be connected to the second conductor via a second switching element, and the first and second pickups may be connected to one another via a third switching element, and
wherein one terminal of the first terminal pair is connected to the first or second pickup of one bridge branch, and one terminal of the second terminal pair is connected to the first or second pickup of the other bridge branch, and
wherein a module of the third module type comprises the following:
a first and a second conductor,
an energy storage element, connected between the first and the second conductor,
a bridge branch connected between the first and the second conductor,
wherein the bridge branch comprises a pickup that may be connected to the first conductor via a first switching element and to the second conductor via a second switching element,
wherein the one terminal of the first terminal pair is connected to the pickup and the other terminal of the first terminal pair may be connected to the first conductor via a third switching element,
wherein a terminal of the second terminal pair may be connected to the first conductor via a fourth switching element, and
wherein the other terminal of the second terminal pair is connected to the second conductor,
and wherein an individual module is derived from a module type by the removal of individual switching elements of the module of the respective type or replacement thereof with conductors in such manner that it is still possible with the remaining switching elements for the energy storage element to be connected selectively in series or in parallel with an energy storage element of an adjacent module.

18. A method for actuating a converter for control of currents and voltages, wherein the converter comprises consecutively connected individual modules and wherein each individual module has at least three, preferably at least four internal switching elements, at least one energy storage element and at least four connectors, wherein pairs of the connectors serve as a first and a second terminal pair, wherein the method comprises the following steps:

connecting the energy storage elements of consecutive individual modules via the internal switching elements in such manner that a selectively series or parallel connection of these energy storage elements is created, wherein the cascade connection of at least two individual modules is designed in such manner that the connectors of the second terminal pair of a preceding individual module are is connected either with the connectors of the first terminal pair of the respective following individual module, or connectors of at least one intermediate module, which is arranged between the preceding individual module and the respective following individual module wherein said actuation comprises switching said internal switching elements such that the energy storage element of each individual module is selectively connected to the energy storage element of a subsequent individual module either in parallel or in series, thereby allowing control of a consecutive connection of several individual modules in such a manner that at least one series connection of energy storage element and one parallel connection of energy storage element is present simultaneously in such consecutive connection, and wherein a diode is additionally arranged parallel to each switching element, and the diodes are connected in such manner that they protect the switching elements from polarity reversal and overload.

19. A method according to claim 18, wherein the individual modules are actuated according to the principle of pulse width modulation such that the converter is able to change the current strength via the duty cycle of the pulse width modulation.

20. A method according to claim 19, wherein the individual modules of the converter are actuated in such manner that a phase offset is created between the current and voltage of a generated AC voltage, such that the converter can be used for power factor correction at the input and or output.

21. The method according to claim 18, in which one or both connectors of any terminal pair are connected selectively to the energy storage element.

* * * * *

UNITED STATES PATENT AND TRADEMARK OFFICE
CERTIFICATE OF CORRECTION

PATENT NO.        : 9,502,960 B2
APPLICATION NO.   : 13/990463
DATED             : November 22, 2016
INVENTOR(S)       : Thomas Weyh et al.

Page 1 of 1

It is certified that error appears in the above-identified patent and that said Letters Patent is hereby corrected as shown below:

In the Claims

Column 24, Claim 1, Lines 23 and 24; please replace "the energy storage elements of each individual module" with --the at least one energy storage element of each individual module--

Signed and Sealed this
Thirtieth Day of May, 2017

Michelle K. Lee
*Director of the United States Patent and Trademark Office*